United States Patent
Tabata

(10) Patent No.: US 8,642,152 B2
(45) Date of Patent: Feb. 4, 2014

(54) OPTICAL INFORMATION RECORDING MEDIUM

(75) Inventor: Hiroshi Tabata, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/358,000

(22) Filed: Jan. 25, 2012

(65) Prior Publication Data

US 2012/0201993 A1     Aug. 9, 2012

(30) Foreign Application Priority Data

Feb. 3, 2011     (JP) .................................. 2011-022183

(51) Int. Cl.
    *G11B 7/24*     (2013.01)
(52) U.S. Cl.
    USPC ..................... 428/64.1; 428/64.4; 430/270.12
(58) Field of Classification Search
    USPC ..................... 428/64.4; 430/270.12
    See application file for complete search history.

(56) References Cited

U.S. PATENT DOCUMENTS

2012/0176883 A1* 7/2012 Tauchi et al. ................. 369/283

FOREIGN PATENT DOCUMENTS

| JP | 2010-137545 | 6/2010 |
| JP | 2010-218636 | 9/2010 |

* cited by examiner

*Primary Examiner* — Elizabeth Mulvaney
(74) *Attorney, Agent, or Firm* — K&L Gates LLP

(57) ABSTRACT

An optical information recording medium including: a substrate; two or more information signal layers provided on the substrate; and a cover layer provided on the information signal layers, wherein the surface of one of the side of the substrate and the cover layer is a light irradiation plane, wherein at least one of the information signal layers other than the information signal layer at the deepest portion from the light irradiation plane includes an inorganic recording layer that includes a W oxide and a Pd oxide, a first protective layer that is provided on a first principal plane of the inorganic recording layer, and a second protective layer that is provided on a second principal plane of the inorganic recording layer, wherein at least one of the first protective layer and the second protective layer is a layer with an extinction coefficient of 0.05 to 0.6.

10 Claims, 10 Drawing Sheets

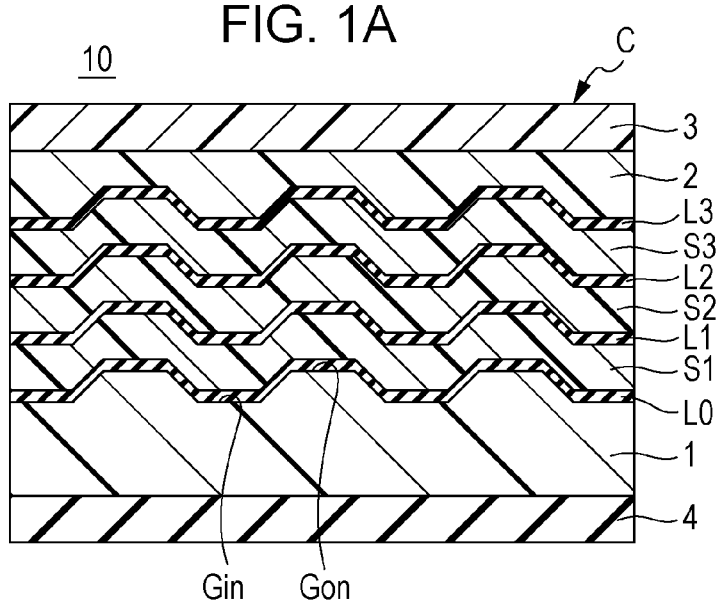
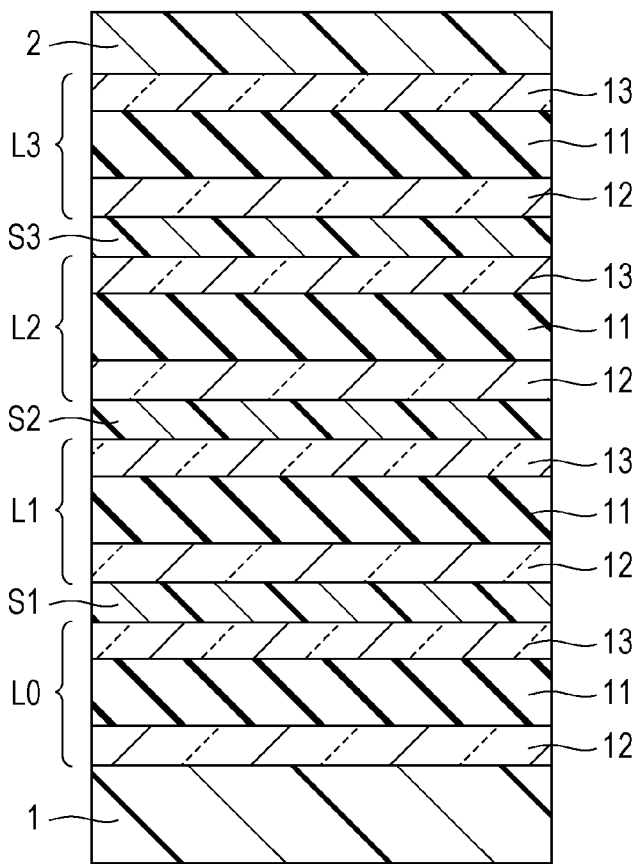

(1) TEST EXAMPLE 3-1: ITO LAYER ON BOTH UPPER AND LOWER SIDES OF WZCPO LAYER
(2) TEST EXAMPLE 3-2: SIZ LAYER ON LOWER SIDE OF WZCPO LAYER
(3) TEST EXAMPLE 3-3: SIZ LAYER ON UPPER SIDE OF WZCPO LAYER
(4) TEST EXAMPLE 3-4: SIZ LAYER ON BOTH UPPER AND LOWER SIDES OF WZCPO LAYER

OPTICAL INFORMATION RECORDING MEDIUM

CROSS REFERENCES TO RELATED APPLICATIONS

The present application claims priority to Japanese Priority Patent Application JP 2011-022183 filed in the Japan Patent Office on Feb. 3, 2011, the entire content of which is hereby incorporated by reference.

BACKGROUND

The present disclosure relates to an optical information recording medium. Specifically, the disclosure relates to an optical information recording medium with two or more information signal layers.

The market for optical information recording media has hitherto been led by CDs (Compact Discs), DVDs (Digital Versatile Discs), and the like. However, in recent years, along with the proliferation of high definition television and dramatic increase in data handled by PCs (Personal Computers), there have been demands for further increases in the capacities of optical information recording media. To meet such demands, mass storage optical information recording media that are compatible with blue lasers such as BDs (Blu-ray Discs (registered trademark)) have appeared, and markets for new mass storage information recording media are being established.

Although there are rewritable optical information recording media typified by the CD-RW (Compact Disc-ReWritable) and the DVD±RW (Digital Versatile Disc±ReWritable) and direct read after write type optical information recording media typified by the CD-R (Compact Disc-Recordable) and the DVD-R (Digital Versatile Disc-Recordable) as recordable optical information recording media, the latter in particular have contributed greatly to the expansion of the market as low cost media. Accordingly, with mass storage optical information recording media that are compatible with blue lasers, lowering the cost of direct read after write type optical information recording media is likewise considered important in order to expand the market. Furthermore, it is generally said that compared to hard disk drives (HDD) or flash memories, optical information recording media have high storage reliability due to the recording and reproduction principle thereof, and there is demand for use as archival media, starting to be used for the storage of critical information.

As the recording material that is used in a direct read after write type optical information recording medium, there are inorganic materials and organic pigment materials. Although organic pigment materials have mainly been considered for the recording material of a direct read after write type optical information recording media of the related art, with the mass storage optical information recording media of recent years, inorganic materials are also being widely considered for the recording material.

As one of the inorganic materials that are being widely considered, there is an inorganic material that includes a Pd oxide. For example, an inorganic recording layer that includes In oxide and Pd oxide where the Pd oxide includes Pd monoxide and Pd dioxide and the ratio of Pd atoms with respect to the total of In atoms and Pd atoms is 6 to 60 atomic % is proposed in Japanese Unexamined Patent Application Publication No. 2010-137545. Further, an inorganic recording layer that includes one or both of In and Sn, Pd, and O is proposed in Japanese Unexamined Patent Application Publication No. 2010-218636.

Incidentally, in recent years, in order to further increase the recording capacity in recordable high-density optical information recording media such as DVDs and BDs, techniques for increasing the number of recording layers have been widely adopted. With a multi-layer optical information recording medium, recording and reproduction of information signals with respect to the recording layer positioned at the deepest portion from the information reading face side is performed using laser light that has been transmitted through the recording layer immediately before the recording layer position at the deepest portion. Therefore, with a recording layer other than the recording layer positioned at the deepest portion from the information reading face side, if the transmittances of the information signal layers change greatly before and after the recording of information signals, since the effective laser strength of the recording layer positioned at the deepest portion changes, recording of information signals on the layer at the deepest portion is not performed appropriately. In particular, with an optical information recording medium with three or more layers, since the number of information signal layers that are transmitted increases and the influence of changes in the transmittance which is multiplied with the number of layers with respect to the layer at the deepest portion becomes rather large, the more layers a medium has, the smaller the changes in the transmittance ought to be before and after recording.

SUMMARY

However, according to the experience of the present applicant, with an information signal layer with an inorganic recording layer that includes a Pd oxide, the transmittance changes greatly before and after the recording of information signals, meaning that recording and reproduction of the information signals may not be appropriately performed.

It is desirable to provide an optical information recording medium that is able to suppress changes in the transmittance of an information signal layer before and after the recording of information signals with an information signal layer with an inorganic recording layer that includes a Pd oxide.

According to an embodiment of the disclosure, an optical information recording medium includes: a substrate; two or more information signal layers provided on the substrate; and a cover layer provided on the information signal layers, wherein the surface of one of the side of the substrate and the cover layer is a light irradiation plane on which light for recording information signals on the two or more information signal layers is irradiated, at least one of the information signal layers other than the information signal layer at the deepest portion from the light irradiation plane includes an inorganic recording layer that includes a W oxide and a Pd oxide, a first protective layer that is provided on a first principal plane of the inorganic recording layer, and a second protective layer that is provided on a second principal plane of the inorganic recording layer, wherein at least one of the first protective layer and the second protective layer is a layer with an extinction coefficient of 0.05 to 0.6.

In the embodiments of the disclosure, the thickness of the cover layer is not particularly limited, and a cover layer includes substrates, sheets, coating layers, and the like. As a high density optical information recording medium, a configuration in which a thin light transmission layer such as a sheet or a coating layer is adopted as the cover layer and recording and reproduction of information signals are performed by irradiating light from such a light transmission layer side is preferable. In such a case, it is also possible to adopt an opaque substrate. The incidence plane of the light for recording or reproducing the information signals is set to at least one of the surface of the cover layer side and the substrate side according to the format of the optical information recording medium as appropriate.

In the embodiments of the disclosure, it is preferable that a layer with an extinction coefficient of 0.05 to 0.6 include a complex of an In oxide and an Sn oxide or silicon nitride as the principal component. It is preferable that one of the first protective layer and the second protective layer be a layer with an extinction coefficient of 0.05 to 0.6, and the other be a layer with an extinction coefficient of 0 to 0.6.

In the embodiments of the disclosure, it is preferable that out of the first protective layer and the second protective layer, the layer on the opposite side to the light irradiation plane be a layer with an extinction coefficient of 0.05 to 0.6, and it is more preferable that both the first protective layer and the second protective layer be layers with extinction coefficients of 0.05 to 0.6.

In the embodiments of the disclosure, it is preferable that one of the first protective layer and the second protective layer be a layer with an extinction coefficient of 0.05 to 0.6, and that the other be a layer that has a complex oxide of an Si oxide, an In oxide, and a Zr oxide or a complex oxide of an In oxide, a Ga oxide, and a Zn oxide as the principal component.

In the embodiments of the disclosure, it is preferable that the inorganic recording layer further include a Cu oxide in addition to a W oxide and a Pd oxide, and it is more preferable that the inorganic recording layer include a Zn oxide in addition to the W oxide, the Pd oxide, and the Cu oxide.

According to the embodiments of the disclosure, since the inorganic recording layer includes a W oxide and a Pd oxide as well as at least one of the first protective layer and the second protective layer having an extinction coefficient of equal to or greater than 0.05, it is possible to suppress changes in the transmittance before and after the recording of the information signal layers. Further, since the extinction coefficient of at least one of the first protective layer and the second protective layer is equal to or less than 0.6, the high transmittance demanded of an information signal layer other than the information signal layer at the deepest portion from the light irradiation plane is able to be obtained.

As described above, according to the embodiments of the disclosure, it is possible to suppress changes in the transmittance before and after the recording of information signals in an information signal layer with an inorganic recording layer that includes a Pd oxide.

Additional features and advantages are described herein, and will be apparent from the following Detailed Description and the figures.

BRIEF DESCRIPTION OF THE FIGURES

FIG. 1A is an outline cross-sectional diagram that illustrates a configuration example of an optical information recording medium according to an embodiment of the disclosure and FIG. 1B is a schematic diagram that illustrates a configuration example of each information signal layer illustrated in FIG. 1A;

DETAILED DESCRIPTION

Figure 2A:
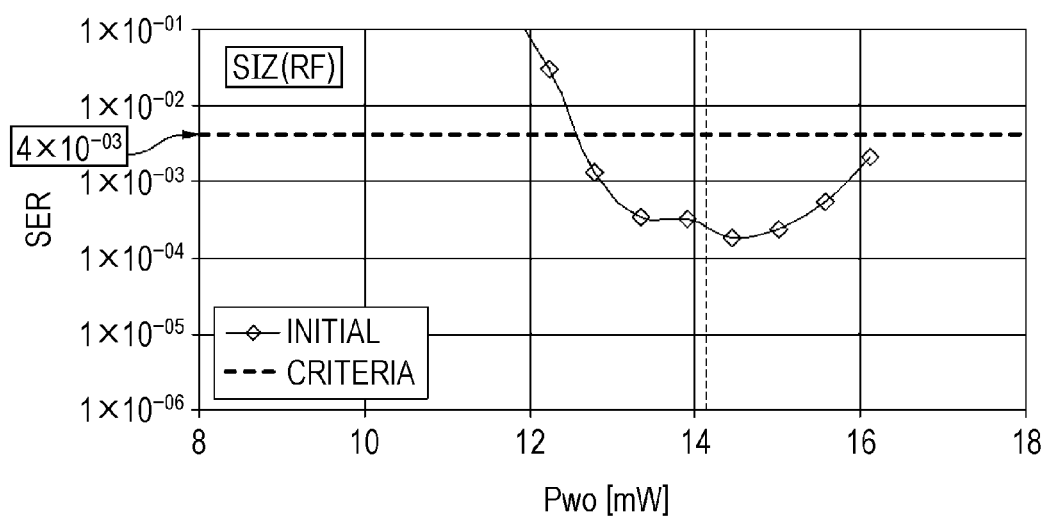
FIG. 2A is a graph that illustrates the power margin of an optical information recording medium of Test Example 1-1 and FIG. 2B is a graph that illustrates the power margin of an optical information recording medium of Test Example 1-2.
Figure 2B:
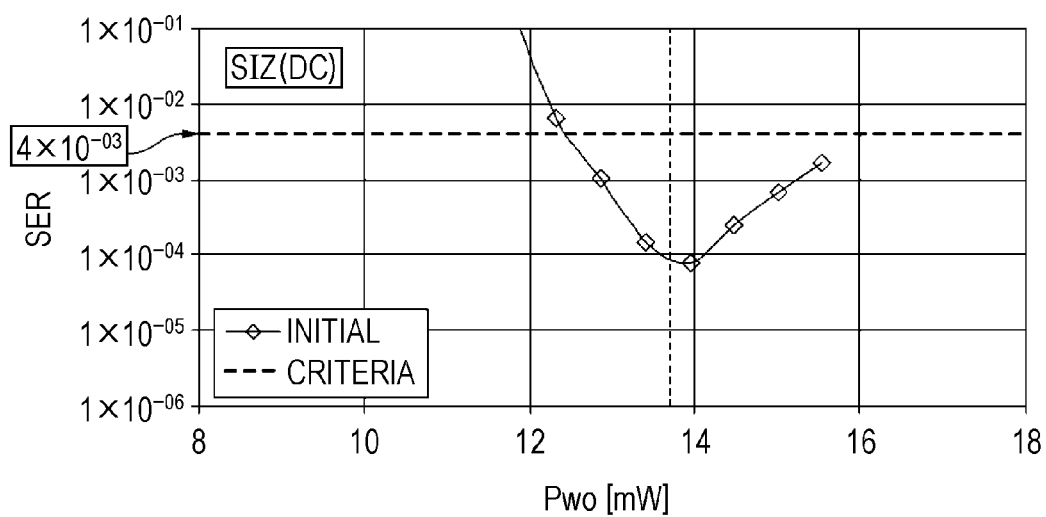
Figure 3:
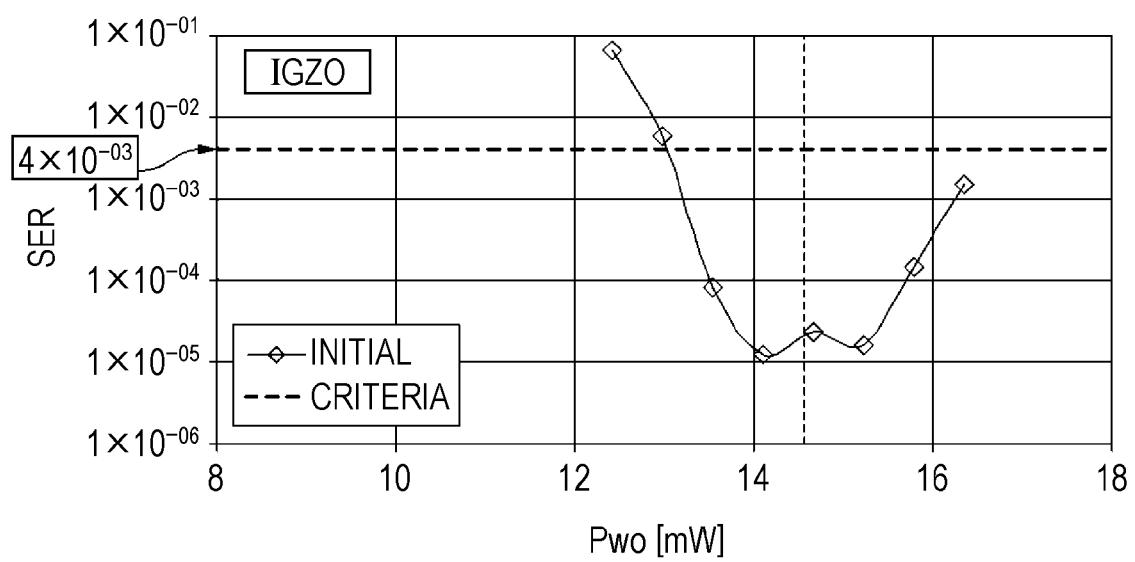
FIG. 3 is a graph that illustrates the power margin of an optical information recording medium of Test Example 1-3.
Figure 4A:
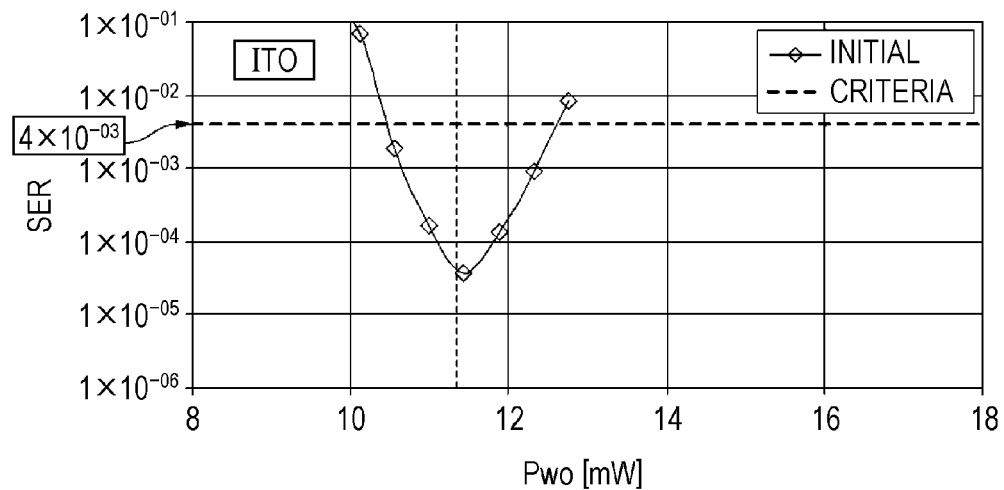
FIG. 4A is a graph that illustrates the power margin of an optical information recording medium of Test Example 1-4 and FIG. 4B is a graph that illustrates the power margin of an optical information recording medium of Test Example 1-5.
Figure 4B:
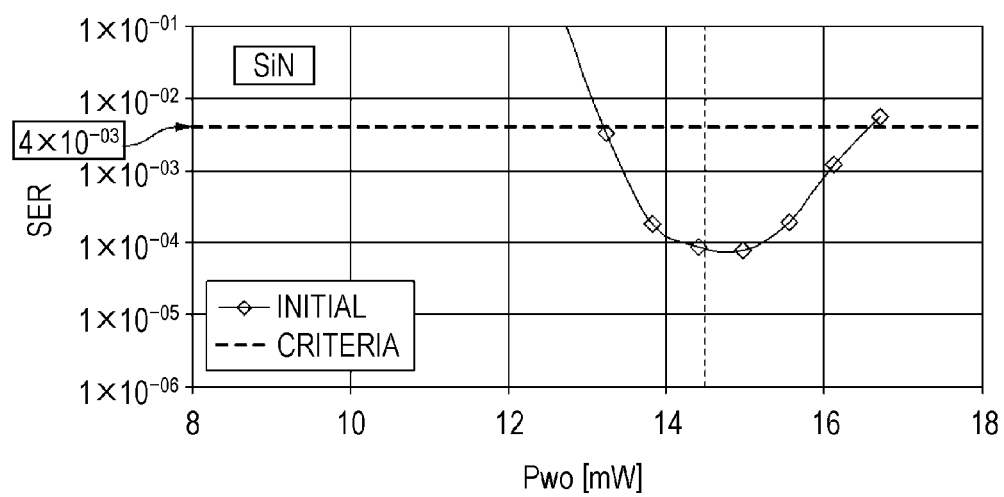

The applicant conducted intensive studies to solve the problems described above. As a result, it was found that (1) using a material in which an In oxide is added to a Pd oxide as the inorganic recording layer and (2) using a protective layer, which is adjacent to the recording layer, with an extinction coefficient k of less than 0.05 greatly affect changes in the transmittance of the information signal layer before and after the recording of information signals.

Accordingly, taking (1) and (2) described above into consideration, the applicant conducted further intensive studies in order to suppress changes in the transmittance of the information signal layer. As a result, a material in which a W oxide is added instead of an In oxide was used as the inorganic recording layer and a protective layer, which is adjacent to the recording layer, with an extinction coefficient k of equal to or greater than 0.05 was used.

The present technique has been devised as a result of the considerations above.

The embodiments of the disclosure will be described below with reference to the drawings.

[Configuration of Optical Information Recording Medium]

FIG. 1A is an outline cross-sectional diagram that illustrates a configuration example of an optical information recording medium according to an embodiment of the disclosure. Such an optical information recording medium 10 is a so-called direct read after write type optical information recording medium, and as illustrated in FIG. 1A, has a configuration in which an information signal layer L0, an intermediate layer S1, an information signal layer L1, an intermediate layer S2, an information signal layer L2, an intermediate layer S3, an information signal layer L3, and a light transmissive layer 2 that is a cover layer are laminated in such an order on the principal plane of a substrate 1. A hard coat layer 3 may be further provided on the surface of the light transmission layer 2 side as necessary. A barrier layer 4 may be further provided on the surface of the substrate 1 side as necessary. Here, in the description below, in a case when the information signal layers L0 to L3 are not particularly distinguished, reference is made to an information signal layer L.

With the optical information recording medium 10 of the embodiment, recording or reproduction of information signals is performed by irradiating laser light on each of the information signal layers L0 to L3 from a surface C of the light transmission layer 2 side. For example, recording or reproduction of information signals is performed by collecting laser light with a wavelength within a range of 400 nm to 410 nm by an objective lens with a numerical aperture of a range of 0.84 to 0.86 and irradiating each of the information signal layers L0 to L3 from the side of the light transmission layer 2. As such an optical information recording medium 10, for example, a BD-R is exemplified. Below, the surface C that is irradiated by laser light for recording or reproducing information signals on the information signal layers L0 to L3 will be referred to as a light irradiation plane C.

The substrate 1, the information signal layers L0 to L3, the intermediate layers S1 to S3, the light transmission layer 2, the hard coat layer 3, and the barrier layer 4 that configure the optical information recording medium 10 will be sequentially described below.

(Substrate)

The substrate 1 has a ring shape, for example, with an opening (referred to as a center hole below) formed at the center. The principal plane of the substrate 1 is, for example, a concavo-convex surface, and the information signal layer L0 is formed on the concavo-convex surface. Below, the concave portions of the concavo-convex surface are referred to as an in-groove Gin, and the convex portions are referred to as an on-groove Gon.

As the shapes of the in-groove Gin and the on-groove Gon, various shapes such as, for example, a spiral shape or a concentric circular shape are exemplified. Further, one or both of the in-groove Gin and the on-groove Gon may be wobbled (meandered) in order to stabilize the linear velocity or add the address information.

120 mm, for example, is selected as the diameter of the substrate 1. The thickness of the substrate 1 is selected with consideration of the rigidity, and for example, 0.3 mm to 1.3 mm is preferably selected, and 0.6 mm to 1.3 mm, for example, 1.1 mm is more preferably selected. Further, for example, 15 mm is selected as the diameter of the center hole.

As the material of the substrate 1, for example a plastic material or glass may be used, and from the viewpoint of cost, a plastic material is preferably used. As a plastic material, for example, a polycarbonate resin, a polyolefin resin, an acryl resin, or the like may be used.

(Information Signal Layer)

FIG. 1B is a schematic diagram that illustrates a configuration example of each information signal layer illustrated in FIG. 1A. As illustrated in FIG. 1B, the information signal layers L0 to L3 includes, for example, an inorganic recording layer 11 with an upper plane (second principal plane) and a lower plane (first principal plane), a first protective layer 12 provided to be adjacent to the lower side face of the inorganic recording layer 11, and a second protective layer 13 provided to be adjacent to the upper plane of the inorganic recording layer 11. With such a configuration, it is possible to improve the storage reliability of the information signal layer L. Here, the upper plane is the principal plane on the side on which laser light for recording or reproduction of information signals is irradiated out of the two principal planes of the inorganic recording layer 11, and the lower plane is the principal plane on the opposite side to the side on which the laser light above is irradiated, that is, the principal plane on the substrate side.

(Inorganic Recording Layer)

The inorganic recording layer 11 has an inorganic recording material that includes a Pd oxide (hereinafter referred to as a "PdO-based material") as the principal component. As the PdO-based material, two elemental oxides of a W oxide and a Pd oxide (hereinafter referred to as "WPO"), preferably three elemental oxides in which a Cu oxide is added to WPO (hereinafter referred to as "WCPO"), and more preferably four elemental oxides in which a Zn oxide is added to WCPO (hereinafter referred to as "WZCPO") is used. By using WPO as the PdO-based material, it is possible to suppress changes in the transmittance before and after the recording of information signals. By using WCPO as the PdO-based material, in addition to the suppression of changes in the transmittance above, the reproduction durability is able to be improved. By using WZCPO as the PdO-based material, it is possible to reduce the content amount of the Pd oxide within the inorganic recording layer 11, specifically, the content rate of the Pd while maintaining approximately the same properties of the inorganic recording layer 11 as a case when WCPO is used. By reducing the content amount of Pd that is a precious metallic material, it is possible to reduce the cost of the optical information recording medium 10.

It is preferable that at least one of the inorganic recording layers 11 out of the information signal layers L1 to L3 other than the information signal layer L0 at the deepest portion from the light irradiation plane C include WCPO as the principal component. The ratio of the W, the Pd, and the Cu that are included in the WCPO preferably satisfies the relationship $0.17 \leq x_1$, more preferably satisfies the relationship $0.37 \leq x_1$, still more preferably satisfies the relationship $0.37 \leq x_1 \leq 1.26$, and most preferably satisfies the relationship $0.56 \leq x_1 \leq 1.26$. In so doing, it is possible to realize excellent transmittance properties while maintaining the properties demanded of an information signal layer of the optical information recording medium. Here, as the properties demanded of an information signal layer of the optical information recording medium, low i-MLSE, a wide recording power margin, high reproduction durability, suppression of changes in the transmittance after recording, and the like are exemplified.

Here, $x_1$ is a variable defined as $x_1 = a/(b+0.8c)$.

a: atomic ratio (atomic %) of W with respect to the total of W, Pd, and Cu b: atomic ratio (atomic %) of Pd with respect to the total of W, Pd, and Cu c: atomic ratio (atomic %) of Cu with respect to the total of W, Pd, and Cu From the viewpoint of increasing the amount of light that reaches the information signal layer L0 at the deepest portion from the light irradiation plane C, it is preferable that other than the information signal layer L0, all of the inorganic recording layers 11 of the information signal layers L1 to L3 have high transmittances.

Further, in addition to the high transmittances, on the other hand, from the viewpoint of securing the properties demanded of high transmittance layers even with high transmittances, it is preferable that all of the inorganic recording layers 11 of the information signal layers L0 to L3 include WCPO as the principal component. In such a case, the ratio of the W, the Pd, and the Cu that are included in the WCPO preferably satisfies the relationship $0.17 \leq x_1$, more preferably satisfies the relationship $0.37 \leq x_1$, still more preferably satisfies the relationship $0.37 \leq x_1 \leq 1.26$, and most preferably satisfies the relationship $0.56 \leq x_1 \leq 1.26$. Further, it is preferable that the value of the variable $x_1$ of the inorganic recording layers 11 of the information signal layers L0 to L3 be a greater value for information signal layers L close to the light irradiation plane C. The reason is that it is preferable that the closer an information signal layer L is to the light irradiation plane C, the higher the transmittance be set.

The atomic ratio a of W with respect to the total of the W, the Pd, and the Cu is preferably within a range of 10 atomic % to 70 atomic %, and more preferably within a range of 14.2 atomic % to 31.8 atomic %. If the atomic ratio a is less than 10 atomic %, the transmittance tends to be low. On the other hand, if the atomic ratio a exceeds 70 atomic %, while the transmittance may be high, the recording sensitivity tends to decrease.

The atomic ratio b of Pd with respect to the total of the W, the Pd, and the Cu is preferably within a range of 2 atomic % to 50 atomic %, and more preferably within a range of 4.4 atomic % to 32.2 atomic %. If the atomic ratio b is less than 2 atomic %, the recording power margin tends to become narrow. On the other hand, if the atomic ratio b exceeds 50 atomic %, the transmittance tends to be low.

The atomic ratio c of Cu with respect to the W, the Pd, and the Cu is preferably within a range of 10 atomic % to 70 atomic %, and more preferably within a range of 28.5 atomic % to 68.1 atomic %. If the atomic ratio c is less than 10 atomic %, the reproduction durability tends to weaken. On the other hand, if the atomic ratio c exceeds 70 atomic %, the transmittance tends to decrease.

It is preferable that the inorganic recording layer 11 of at least one of the information signal layers L1 to L3 information signal layer other than the information signal layer L0 that is at the deepest portion of the light irradiation plane C include WZCPO in which a Zn oxide is further added to WCPO as the principal component. The ratio of the W, the Pd, the Cu, and the Zn that are included in WZCPO preferably satisfies the relationship $0.17 \leq x_2$, more preferably satisfies the relationship $0.37 \leq x_2$, still more preferably satisfies the relationship $0.37 \leq x_2 \leq 1.26$, and most preferably satisfies the relationship $0.56 \leq x_2 \leq 1.26$. In so doing, it is possible to lower the content amount of the W oxide, the Pd oxide, and the Cu oxide while satisfying the properties demanded of a recording layer of an optical information recording medium and realizing excellent transmittance properties. It is possible to lower the cost of the optical information recording medium 10 by reducing the content amount of the W oxide, the Pd oxide, and the Cu oxide, especially the Pd oxide that includes a precious metal.

Here, $x_2$ is a variable defined as $x_2=(0.1d+a)/(b+0.8c)$.

a: atomic ratio (atomic %) of W with respect to the total of W, Pd, Cu, and Zn b: atomic ratio (atomic %) of Pd with respect to the total of W, Pd, Cu, and Zn c: atomic ratio (atomic %) of Cu with respect to the total of W, Pd, Cu, and Zn d: atomic ratio (atomic %) of Zn with respect to the total of W, Pd, Cu, and Zn From the viewpoint of increasing the amount of light that reaches the information signal layer L0 at the deepest portion from the light irradiation plane C, it is preferable that all of the inorganic recording layers 11 of the information signal layers L1 to L3 other than the information signal layer L0 have high transmittances.

Further, in addition to the high transmittances, on the other hand, from the viewpoints of securing the properties demanded of high transmittance layers even with high transmittances and lowering the cost of the optical information recording medium, it is preferable that all of the inorganic recording layers 11 of the information signal layers L0 to L3 include WZCPO as the principal component. In such a case, the ratio of the W, the Pd, and the Cu that are included in the WZCPO preferably satisfies the relationship $0.17 \leq x_2$, more preferably satisfies the relationship $0.37 \leq x_2$, still more preferably satisfies the relationship $0.37 \leq x_2 \leq 1.26$, and most preferably satisfies the relationship $0.56 \leq x_2 \leq 1.26$. Further, it is preferable that the value of the variable $x_2$ of the inorganic recording layers 11 of the information signal layers L0 to L3 be a greater value for information signal layers L close to the light irradiation plane C. The reason is that the closer an information signal layer L is to the light irradiation plane C, the greater the transmittance is able to be.

The atomic ratio a of W with respect to the total of the W, the Pd, the Cu, and the Zn is preferably within a range of 10 atomic % to 70 atomic %, and more preferably within a range of 14.2 atomic % to 31.8 atomic %. If the atomic ratio a is less than 10 atomic %, the transmittance tends to be low. On the other hand, if the atomic ratio a exceeds 70 atomic %, the recording sensitivity tends to decrease.

The atomic ratio b of Pd with respect to the total of the W, the Pd, the Cu, and the Zn is preferably within a range of 2 atomic % to 50 atomic %, and more preferably within a range of 4.4 atomic % to 32.2 atomic %. If the atomic ratio b is less than 2 atomic %, the recording power margin tends to become narrow. On the other hand, if the atomic ratio b exceeds 50 atomic %, the transmittance tends to be low.

The atomic ratio c of Cu with respect to the W, the Pd, the Cu, and the Zn is preferably within a range of 10 atomic % to 70 atomic %, and more preferably within a range of 28.5 atomic % to 43.4 atomic %. If the atomic ratio c is less than 10 atomic %, the reproduction durability tends to weaken. On the other hand, if the atomic ratio c exceeds 70 atomic %, the transmittance tends to decrease.

The atomic ratio d of Zn with respect to the W, the Pd, the Cu, and the Zn is preferably within a range of 5 atomic % to 60 atomic %, and more preferably within a range of 17 atomic % to 41 atomic %. If the atomic ratio d is less than 5 atomic %, the cost reducing effect tends to weaken. On the other hand, if the atomic ratio d exceeds 60 atomic %, the storage reliability tends to deteriorate.

As the material of the information signal layers L1 to L3 other than the WCPO and the WZCPO described above, for example, it is possible to use a complex oxide of an In oxide and a Pd oxide as the principal component. However, from the viewpoints of maintaining the properties demanded of the information signal layers of an optical information recording medium while realizing excellent transmittance properties and the suppression of changes to the transmittances of information signal layers before and after the recording, it is preferable to use WCPO or WZCPO.

As the material of the information signal layer L0 at the deepest portion from the light irradiation plane C, for example, it is also possible to use a complex oxide of an In oxide and a Pd oxide as the principal component. However, from the viewpoint of wide recording power margins, it is preferable to use the WCPO or the WZCPO above.

The thickness of an inorganic recording layer 11 is preferably within a range of 25 nm to 60 nm, and more preferably 30 nm to 50 nm. If the thickness is less than 25 nm, the i-MLSE, the modulation, and the signal properties tend to deteriorate. On the other hand, if the thickness exceeds 60 nm, the recording power margin tends to become narrow.

(First Protective Layer, Second Protective Layer)

It is preferable to use dielectric layers or transparent conductive layers as the first protective layer 12 and the second protective layer 13, and it is possible to use a dielectric layer for one of the first protective layer 12 and the second protective layer 13 and a transparent conductive layer for the other. By the dielectric layers or the transparent conductive layers functioning as oxygen barrier layers, it is possible to improve the durability of the inorganic recording layers 11. Further, by suppressing oxygen from escaping from the inorganic recording layers 11, it is possible to suppress changes (mainly detected as a decrease in the reflectance) in the film quality of the recording films, and it is possible to secure a film quality that is demanded of the inorganic recording layers 11. Furthermore, by providing dielectric layers or transparent conductive layers, it is possible to improve the recording properties. It is considered that the reason is that by thermal diffusion from laser light that is incident on the dielectric layers or the transparent conductive layers being optimally suppressed, bubbles on the recording portions being suppressed from becoming too large, and bubbles being suppressed from popping by the disintegration of the Pd oxide progressing too far, it is possible to optimize the forms of the bubbles during recording.

The thickness of the first protective layer 12 is preferably within a range of 2 nm to 20 nm. If the thickness is less than 2 nm, the barrier effect to the recording layer tends to be lessened. On the other hand, if the thickness exceeds 20 nm, the recording power margin tends to narrow.

The thickness of the second protective layer 13 is preferably within a range of 2 nm to 50 nm. If the thickness is less than 2 nm, the barrier effect to the recording layer tends to be lessened. On the other hand, if the thickness exceeds 50 nm, the recording power margin tends to narrow.

It is preferable that in addition to high transmittances, the configurations of the first protective layer 12 and the second protective layer 13 that the information signal layers L1 to L3 other than the information signal layer L0 have be selected from the viewpoints of (a) realization of a favorable power margin, (b) suppression of changes to the transmittance before and after recording, and (c) combining the realization of a favorable power margin and the suppression of changes to the transmittance before and after recording.

The configurations of the first protective layer 12 and the second protective layer 13 will be sequentially described below from the viewpoints of (a) realization of a favorable power margin, (b) suppression of changes to the transmittance before and after recording, and (c) combining the realization of a favorable power margin and the suppression of changes to the transmittance before and after recording.

(a) Realization of Favorable Power Margin

From the viewpoint of realizing a favorable power margin, it is preferable that at least one of the first protective layer 12 and the second protective layer 13 include a three elemental oxide of an Si oxide, an In oxide, and a Zr oxide ($SiO_2$—$In_2O_3$—$ZrO_2$: hereinafter referred to as "SIZ") or a three elemental oxide of an In oxide, a Ga oxide, and a Zn oxide ($In_2O_3$—$Ga_2O_3$—$ZnO$: hereinafter referred to as "IGZO") as the principal component as a complex oxide. Here, although it is possible for the first protective layer 12 and the second protective layer 13 to adopt the same material or composition ratio, without limiting to such an example, different materials and composition ratios may be adopted for the first protective layer 12 and the second protective layer 13. For example, although it is possible for both the first protective layer and the second protective layer to include SIZ or IGZO as the principal components, without limiting to such an example, one of the first protective layer and the second protective layer may include SIZ as the principal component and the other may include IGZO as the principal component.

In a case when at least one of the first protective layer 12 and the second protective layer 13 includes SIZ or IGZO as the principal component, it is preferable that WCPO be adopted as the principal component as the inorganic recording layer 11, and it is more preferable that WZCPO in which a Zn oxide is added to the WCPO be adopted as the principal component. In a case when WCPO or WZCPO is the principal component of the inorganic recording layer 11, it is possible to obtain a favorable power margin as compared to a case when the principal component of the inorganic recording layer 11 is a PdO-based material other than WCPO or WZCPO. In a case when the principal component of the inorganic recording layer 11 is WZCPO, the advantage of lowering the cost of the optical information recording medium 10 is able to be further obtained. The reason is that since the WCPO is able to be thinned by further including a Zn oxide in the WCPO, the content amount of Pd that is a precious metallic material.

It is preferable that in at least one of the information signal layers L1 to L3 information signal layer other than the information signal layer L0 at the deepest portion from the light irradiation plane C adopt a configuration in which at least one of the first protective layer 12 and the second protective layer 13 adopts SIZ or IGZO as the principal component, and it is more preferable that both of the first protective layer 12 and the second protective layer 13 adopt a configuration in which SIZ or IGZO is the principal component. By adopting such a configuration, it is possible to maintain a high transmittance and to increase the amount of light of the laser light that reaches the information signal layer L0.

From the viewpoint of increasing the amount of light of the laser light that reaches the information signal layer L0, it is preferable that all of the information signal layers L1 to L3 other than the information signal layer L0 at the deepest portion from the light irradiation plane C adopt a configuration in which one of the first protective layer 12 and the second protective layer 13 has SIZ or IGZO as the principal component, and it is more preferable that both of the first protective layer 12 and the second protective layer 13 adopt a configuration in which SIZ or IGZO is the principal component.

From the viewpoint of maintaining the transmittance of the information signal layer L3 that is closest to the light irradiation plane C to be high, it is preferable that at least one of the first protective layer 12 and the second protective layer 13 that the information signal layer L3 includes has SIZ or IGZO with a small extinction coefficient as the principal component, and it is more preferable that both layers have SIZ or IGZO as the principal component. The reason for the transmittance of the information signal layer L3 that is closest to the light irradiation plane C out of the information signal layers L1 to L3 to be high is that generally, in balancing the recording density that has a tradeoff with the transmittance, a multi-layer medium that is configured to combine lowering the transmittance with high sensitivity as a single layer is able to approximately fix the recording sensitivity of each layer of a multi-layer medium by a combination of the transmittance and the sensitivity more for an information signal layer L that is a single layer of the information signal layer L3, has high transmittance, low recording sensitivity, while on the other hand is further away from the light irradiation plane C. Here, the extinction coefficient k of SIZ and IGZO is 0.00.

Although it is possible to obtain a favorable power margin by one of the first protective layer 12 and the second protective layer 13 including SIZ or IGZO as the principal component, from the viewpoint of obtaining a more favorable power margin, it is preferable that both the first protective layer 12 and the second protective layer 13 include SIZ or IGZO as the principal component. In a case when one of the first protective layer 12 and the second protective layer 13 adopts a configuration in which SIZ or IGZO is adopted as the principal component, it is preferable that the first protective layer 12 that is provided to the lower plane of the inorganic recording layer 11 has SIZ or IGZO as the principal component. The reason is that by the first protective layer 12 that is provided to the lower plane of the inorganic recording layer 11 having SIZ or IGZO as the principal component, the power margin is able to be further improved compared to a case when the second protective layer 13 that is provided on the upper plane of the inorganic recording layer 11 has SIZ or IGZO as the principal component.

In the case of a configuration in which one of the first protective layer 12 and the second protective layer 13 has a configuration of having SIZ or IGZO as the principal component, a dielectric material or a transparent conductive material, for example, is able to be used as the principal component of the other layer, and specifically, an oxide, a nitride, a sulfide, a carbide, a fluoride, or a mixture thereof is able to be used. As an oxide, for example, an oxide with one or more elements selected from a group composed of In, Zn, Sn, Al, Si, Ge, Ti, Ga, Ta, Nb, Hf, Zr, Cr, Bi, and Mg is exemplified. As a nitride, for example, a nitride with one or more elements selected from a group composed of In, Sn, Ge, Cr, Si, Al, Nb, Mo, Ti, Nb, Mo, Ti, W, Ta, and Zn, and more preferably a nitride with one or more elements selected from a group composed of Si, Ge, and Ti is exemplified. As a sulfide, for example, a Zn sulfide is exemplified. As a carbide, for example, a carbide with one or more elements selected from a group composed of In, Sn, Ge, Cr, Si, Al, Ti, Zr, Ta, and W, and more preferably a carbide with one or more elements selected from a group composed of Si, Ti, and W is exemplified. As a fluoride, for example, a fluoride with one or more elements selected from a group composed of Si, Al, Mg, Ca, and La is exemplified. As a mixture thereof, for example, $ZnS$—$SiO_2$, $SiO_2$—$Cr_2O_3$—$ZrO_2$ (SCZ), $In_2O_3$—$SnO_2$ (ITO), $In_2O_3$—$CeO_2$ (ICO), $In_2O_3$—$Ga_2O_3$ (IGO), $Sn_2O_3$—$Ta_2O_5$ (TTO), $TiO_2$—$SiO_2$, and the like are exemplified.

(b) Suppression of Changes in Transmittance Before and after Recording

It is preferable that at least one of the first protective layer 12 and the second protective layer 13 be a layer with an extinction coefficient of 0.05 to 0.6. If the extinction coefficient is less than 0.05, changes in the transmittance before and after the recording of the information signal layer L tend to become large. On the other hand, if the extinction coefficient k exceeds 0.6, there is a tendency for the transmittance of the information signal layers L to be lowered where it is difficult to obtain sufficient transmittances as the information signal layers L1 to L3. Here, although it is possible to adopt the same extinction coefficient as the extinction coefficients of the first protective layer 12 and the second protective layer 13, without limiting to such an example, different extinction coefficients may be adopted as the first protective layer 12 and the second protective layer 13.

In a case when at least one of the first protective layer 12 and the second protective layer 13 is a layer with an extinction coefficient of 0.05 to 0.6, it is preferable that WPO be adopted as the principal component of the inorganic recording layer 11, more preferable that WCPO be adopted, and most preferable that WZCPO be adopted. By such a combination, it is possible to suppress changes in the transmittance before and after recording to be small. Here, in a case when WCPO is adopted as the principal component of the inorganic recording layer 11, in addition to the suppression of changes in the transmittance, the advantage of an improvement in the power margin is further obtained. In a case when WZCPO is adopted as the principal component of the inorganic recording layer 11, in addition to the suppression of changes in the transmittance and the improvement of the power margin, the advantage of lowering the cost of the optical information recording medium 10 is further obtained. Further, from the viewpoint of suppressing changes in the transmittance, WZPO may be adopted as the principal component as the inorganic recording layer 11.

It is preferable that in at least one of the information signal layers L1 to L3 other than the information signal layer L0 at the deepest portion from the light irradiation plane C, at least one of the first protective layer 12 and the second protective layer 13 be a layer with an extinction coefficient of 0.05 to 0.6, and it is more preferable that both the first protective layer 12 and the second protective layer 13 adopt a configuration of having an extinction coefficient of 0.05 to 0.6. If the extinction coefficient k is less than 0.05, the light amount of the laser light that reaches the information signal layer L0 before and after the recording of information signals tends to change greatly. If the extinction coefficient exceeds 0.6, there is a tendency for the light amount of the laser light that reaches the information signal layer L0 to decrease, where a sufficient light amount of the laser light does not reach the information signal layer L0.

From the viewpoint of suppressing changes in the light amount of the laser light that reaches the information signal layer L0 before and after the recording of information signals, it is preferable that a configuration in which at least one of the first protective layer 12 and the second protective layer 13 has an extinction coefficient of 0.05 to 0.6 be adopted for all of the information signal layers L1 to L3 other than the information signal layer L0 at the deepest portion from the light irradiation plane C, and it is more preferable that a configuration in which both the first protective layer 12 and the second protective layer 13 have an extinction coefficient of 0.05 to 0.6 be adopted.

Although changes in the transmittance before and after recording are able to be suppressed by one of the first protective layer 12 and the second protective layer 13 having an extinction coefficient of 0.05 to 0.6, from the viewpoint of further suppressing changes in the transmittance before and after recording, it is preferable that both the first protective layer 12 and the second protective layer 13 have an extinction coefficient of 0.05 to 0.6. In a case when one of the first protective layer 12 and the second protective layer 13 adopts a configuration of having an extinction coefficient of 0.05 to 0.6, it is preferable that the first protective layer 12 that is provided on the lower plane of the inorganic recording layer 11 have an extinction coefficient of 0.05 to 0.6. The reason is that by the first protective layer 12 that is provided to the lower plane of the inorganic recording layer 11 having an extinction coefficient of 0.05 to 0.6, changes in the transmittance before and after recording are able to be further suppressed compared to a case when the second protective layer 13 that is provided on the upper plane of the inorganic recording layer 11 has an extinction coefficient of 0.05 to 0.6.

In a case when one of the first protective layer 12 and the second protective layer 13 has an extinction coefficient of 0.05 to 0.6, it is preferable that the other layer have an extinction coefficient of 0 to 0.6. The reason is that by making the extinction coefficient of the other layer equal to or less than 0.6, the transmittance of the information signal layer L is able to be improved.

As the materials of the first protective layer 12 and the second protective layer 13 with an extinction coefficient of 0.05 to 0.6, for example, a mixture of an In oxide and an Sn oxide or silicon nitride is able to be used. Here, silicon nitride is where nitrogen has a non-stoichiometric composition (incomplete nitride), and specifically, is represented by SiNx (x<1.0).

A dielectric material or a transparent conductive material, for example, is able to be used as the material of the first protective layer 12 and the second protective layer 13 with an extinction coefficient of 0 to 0.6, and specifically, an oxide, a nitride, a sulfide, a carbide, a fluoride, or a mixture thereof is able to be used. As an oxide, for example, an oxide with one or more elements selected from a group composed of In, Zn, Sn, Al, Si, Ge, Ti, Ga, Ta, Nb, Hf, Zr, Cr, Bi, and Mg is exemplified. As a nitride, for example, a nitride with one or more elements selected from a group composed of In, Sn, Ge, Cr, Si, Al, Nb, Mo, Ti, Nb, Mo, Ti, W, Ta, and Zn, and more preferably a nitride with one or more elements selected from a group composed of Si, Ge, and Ti is exemplified. As a sulfide, for example, a Zn sulfide is exemplified. As a carbide, for example, a carbide with one or more elements selected from a group composed of In, Sn, Ge, Cr, Si, Al, Ti, Zr, Ta, and W, and more preferably a carbide with one or more elements selected from a group composed of Si, Ti, and W is exemplified. As a fluoride, for example, a fluoride with one or more elements selected from a group composed of Si, Al, Mg, Ca, and La is exemplified. As a mixture thereof, for example, $ZnS$—$SiO_2$, $SiO_2$—$In_2O_3$—$ZrO_2$ (SIZ), $SiO_2$—$Cr_2O_3$—$ZrO_2$ (SCZ), $In_2O_3$—$SnO_2$ (ITO), $In_2O_3$—$CeO_2$ (ICO), $In_2O_3$—$Ga_2O_3$ (IGO), $In_2O_3$—$Ga_2O_3$—$ZnO$ (IGZO), $Sn_2O_3$—$Ta_2O_5$ (TTO), $TiO_2$—$SiO_2$, and the like are exemplified.

(c) Combining Realization of Favorable Power Margin and Suppression of Changes in Transmittance Before and after Recording It is preferable that at least one of the first protective layer 12 and the second protective layer 13 be a layer with SIZ or IGZO as the principal component, and the other be a layer with an extinction coefficient k of 0.05 to 0.6. In so doing, it is possible to combine the realization of a favorable power margin with the suppression of changes in the transmittance before and after recording.

With the information signal layer L2 that is second closest to the light irradiation plane C, it is preferable that at least one of the first protective layer 12 and the second protective layer 13 be a layer with SIZ or IGZO as the principal component, and that the other be a layer with an extinction coefficient k of 0.05 to 0.6. In so doing, it is possible to combine the realization of a favorable power margin with the suppression of changes in the transmittance before and after recording in the information signal layer L2 that is second closest to the light irradiation plane C.

It is preferable to use combinations of the configurations below as the information signal layers L0 to L3. With the L1 layer that is close to the layer at the deepest portion where $x_1$ and $x_2$ have small composition ratios and a high sensitivity is demanded, changes in the transmittance after recording tend to be large since there tends to be much Pd and Cu, and it is therefore preferable that changes in the transmittance be suppressed using a first protective layer 12 and a second protective layer 13 with an extinction coefficient of equal to or greater than 0.05. Further, with the L3 layer where $x_1$ and $x_2$ have large composition ratios and a high transmittance is demanded, since the power margin tends to become narrow while changes in the transmittance after recording are small, it is preferable to secure the power margin using SIZ or IGZO as the first protective layer 12 or the second protective layer 13. Furthermore, with the L2 layer, the property of each layer in terms of the power margin or the suppression of changes in the transmittance are able to be averaged using a combination of the L1 layer and the L3 layer even if the materials of the recording layers or the sensitivity and the transmittance that are demanded are different.

(Information Signal Layer L0)
First protective layer 12: ITO
Inorganic recording layer 11: WCPO ($0.4 \le x_1 \le 0.6$), preferably WZCPO ($0.4 \le x_2 \le 6$)
Second protective layer 13: ITO (Information Signal Layer L1)
First protective layer 12: material in which the extinction coefficient k is within a range of 0.05 to 0.6, preferably ITO
Inorganic recording layer 11: WCPO ($0.5 \le x_1 \le 0.9$), preferably WZCPO ($0.5 \le x_2 \le 9$)
Second protective layer 13: material in which the extinction coefficient k is within a range of 0.05 to 0.6, preferably ITO (Information Signal Layer L2)
First protective layer 12: material in which the extinction coefficient is within a range of 0.05 to 0.6, preferably ITO
Inorganic recording layer 11: WCPO ($0.8 \le x_1 \le 1.2$), preferably WZCPO ($0.8 \le x_2 \le 1.2$)
Second protective layer 13: SIZ or IGZO (Information Signal Layer L3)
First protective layer 12: SIZ or IGZO
Inorganic recording layer 11: WCPO ($0.8 \le x_1 \le 1.2$), preferably WZCPO ($0.8 \le x_2 \le 1.2$)
Second protective layer 13: SIZ or IGZO (Intermediate Layers)
The intermediate layers S1 to S3 serve the roles of physically and optically separating L0 from L1, L2, and L3 to keep sufficient distances, concavo-convex surfaces are provided on the surfaces thereof, and concentric circular or spiral-shaped grooves (in-grooves Gin and on-grooves Gon) are formed thereon. The thicknesses of the intermediate layers S1 to S3 are preferably set to 9 μm to 50 μm, and for example, S1 is 15 μm, S2 is 20 μm, and S3 is 10 μm. Although the materials of the intermediate layers S1 to S3 are not particularly limited, it is preferable to use an ultraviolet curable acryl resin, and since the intermediate layers S1 to S3 become the light paths of the laser light for the recording and reproduction of data to the back layers, it is preferable that the materials have sufficiently high light transmittance.

(Light Transmission Layer)
The light transmission layer 2 is a resin layer in which a light-sensitive resin such as, for example, an ultraviolet curable resin is cured. As a material of such a resin layer, for example, an ultraviolet curable type acrylic resin is exemplified. Further, the light transmission layer 2 may be configured by a ring-shaped light transmission sheet and an adhesion layer for pasting the light transmission sheet on the substrate 1. It is preferable that the light transmission sheet be composed of a material with low absorbability with respect to the laser light that is used in recording and reproduction, and specifically, it is preferable that the light transmission sheet be composed of a material with a transmittance equal to or greater than 90%. As the material of the light transmission sheet, for example, a polycarbonate resin material, a polyolefin resin (for example, ZEONEX (registered trademark), or the like may be used. As the material of the adhesion layer, for example, an ultraviolet curable resin, a pressure sensitive adhesive (PSA), or the like may be used.

The thickness of the light transmission layer 2 is preferably selected from a range of 10 μm to 177 μm, and for example, in the case of a four-layer medium, 53.5 μm is selected. By combining such a thin light transmission layer 2 with an objective lens with high NA (numerical aperture), for example, of approximately 0.85, high density recording is able to be realized.

(Hard Coat Layer)

The hard coat layer 3 is for conferring anti-scratching properties and the like on the light irradiation plane C. As the material of the hard coat layer 3, for example, an acrylic resin, a silicone resin, a fluorine resin, organic inorganic hybrid resin, or the like may be used.

(Barrier Layer)

The barrier layer 4 is for suppressing the outgassing (moisture release) from the back face of the substrate 1 during the film formation process. Further, the barrier layer 4 also functions as a moisture-proof layer that suppresses the absorption of moisture on the back face of the substrate 1. Although the material that configures the barrier layer 4 is not particularly limited as long as outgassing (moisture release) from the back face of the substrate 1 is able to be suppressed, to give an example, a dielectric with low gas transmission may be used. As such a dielectric, for example, SiN, $SiO_2$, TiN, AlN, $ZnS$—$SiO_2$, or the like may be used. The thickness of the barrier layer 4 is preferably set to 5 nm to 40 nm. If the thickness is less than 5 nm, the barrier function of suppressing outgassing from the substrate back face tends to decrease. The reason is that on the other hand, if the thickness is greater than 40 nm, there is hardly any difference from a case when the barrier function of suppressing outgassing is lower, and further, productivity tends to decrease. It is preferable that the moisture transmittance of the barrier layer 4 be equal to or less than $5 \times 10^{-5}$ $g/cm^2$ per day.

With the optical information recording medium 10 of the configuration described above, when laser light is irradiated on the inorganic recording layers 11, the Pd oxide is heated and disintegrated by the laser light to release oxygen, and bubbles are generated on portions that are irradiated by the laser light. Irreversible recording of information signals is thereby able to be performed.

[Manufacturing Method of Optical Information Recording Medium]

Next, an example of a manufacturing method of an optical information recording medium according to an embodiment of the disclosure will be described.

(Formation Process of Substrate)

First, the substrate 1 in which a concavo-convex surface is formed on the principal plane is formed. As the formation method of the substrate 1, for example, an injection formation method, a photopolymerization method (2P method), and the like may be used.

(Formation Process of Information Signal Layers)

Next, the information signal layer L0 is formed by sequentially laminating the first protective layer 12, the inorganic recording layer 11, and the second protective layer 13 on the substrate 1 by a sputtering method, for example.

The formation process of the first protective layer 12, the inorganic recording layer 11, and the second protective layer 13 will be described below in detail.

(Film Formation Process of First Protective Layer)

First, the substrate 1 is transported into a vacuum chamber in which a target for the formation of the first protective layer is provided, and the inside of the vacuum chamber is vacuum drawn until the vacuum chamber reaches a predetermined pressure. The first protective layer 12 is then formed on the substrate 1 by sputtering the target while introducing a process gas such as Ar gas or $O_2$ gas into the vacuum chamber. Although a radio frequency (RF) sputtering method or a direct current (DC) sputtering method, for example, may be used as the sputtering method, the direct current sputtering method is particularly preferable. The reason is that since the direct current sputtering method has a high film forming rate compared to the radio frequency sputtering method, it is possible to improve productivity.

(Film Formation Process of Inorganic Recording Layer)

Next, the substrate 1 is transported into a vacuum chamber in which a target for the film formation of the inorganic recording layer is provided, and the inside of the vacuum chamber is vacuumed until the vacuum chamber reaches a predetermined pressure. The inorganic recording layer 11 is then formed on the first protective layer 12 by sputtering the target while introducing a process gas such as Ar gas or $O_2$ gas into the vacuum chamber.

(Film Formation Process of Second Protective Layer)

Next, the substrate 1 is transported into a vacuum chamber in which a target for the formation of the second protective layer is provided, and the inside of the vacuum chamber is vacuumed until the vacuum chamber reaches a predetermined pressure. The second protective layer 13 is then formed on the inorganic recording layer 11 by sputtering the target while introducing a process gas such as Ar gas or $O_2$ gas into the vacuum chamber. Although a radio frequency (RF) sputtering method or a direct current (DC) sputtering method, for example, may be used as the sputtering method, the direct current sputtering method is particularly preferable. The reason is that since the direct current sputtering method has a high film forming rate compared to the radio frequency sputtering method, it is possible to improve productivity.

By the above, the information signal layer L0 is formed over the substrate 1.

(Formation Process of Intermediate Layer)

Next, an ultraviolet curable resin is evenly applied over the information signal layer L0 by a spin coating method, for example. After then irradiating ultraviolet rays on the ultraviolet curable resin and curing the resin by pressing the concavo-convex pattern of a stamper on the ultraviolet curable resin that is evenly applied over the information signal layer L0, the stamper was removed. In so doing, the concavo-convex pattern of the stamper is transferred on the ultraviolet curable resin, and for example, the intermediate layer S1 on which the in-groove Gin and the on-groove Gon are provided is formed over the information signal layer L0.

Here, an inorganic recording layer film formation target, a first protective layer formation target, and a second protective layer formation target will be described.

(Inorganic Recording Layer Film Formation Target)

The inorganic recording layer film formation target may be a WCP metallic target in which W, Cu, and Pd are the principal components, may be a WCPO oxide target in which a W oxide, a Cu oxide, and a Pd oxide are the principal components, and if productivity is considered, it is preferable that a metallic target with W, Cu, and Pd as the principal components where DC sputtering with which the film formation rate is able to be made comparatively fast be used. The ratio of the W, the Pd, and the Cu that are included in the target preferably satisfies the relationship $0.17 \leq x_1$, more preferably satisfies the relationship $0.37 \leq x_1$, still more preferably satisfies the relationship $0.37 \leq x_1 \leq 1.26$, and most preferably satisfies the relationship $0.56 \leq x_1 \leq 1.26$. Here, as described above, $x_1$ is a variable defined by $x_1 = a/(b+0.8c)$.

The inorganic recording layer film formation target may be a WZCP metallic target in which W, Cu, Pd, and Zn are the principal components, may be a WZCPO oxide target in which a W oxide, a Cu oxide, a Pd oxide, and a Zn oxide are the principal components, or a target of a WZCPO mixture of a metal and an oxide. If productivity is considered, it is preferable that a metallic target with W, Cu, Pd, and Zn as the principal components where DC sputtering with which the film formation rate is able to be made comparatively fast be used. The ratio of the W, the Pd, the Cu, and the Zn that are included in the target preferably satisfies the relationship $0.17 \leq x_2$, more preferably satisfies the relationship $0.37 \leq x_2$, still more preferably satisfies the relationship $0.37 \leq x_2 \leq 1.26$, and most preferably satisfies the relationship $0.56 \leq x_2 \leq 1.26$. Here, as described above, $x_2$ is a variable defined by $x_2 = (0.1d+a)/(b+0.8c)$.

As the WCP, the WCPO, and the WZCPO of the inorganic recording layer film formation target, it is preferable that the same composition as the inorganic recording layer 11 be used.

(First Protective Layer Formation Target, Second Protective Layer Formation Target)

From the viewpoint of improving the power margin, it is preferable that at least one of the first protective layer formation target and the second protective layer formation target include SIZ or IGZO, and it is more preferable that both targets include SIZ or IGZO as the principal component. In a case when one of the first protective layer formation target and the second protectively layer formation target has SIZ or IGZO as the principal component, it is preferable that the first protective layer formation target have SIZ or IGZO as the principal component. The reason is that by the first protective layer 12 that is provided on the lower plane of the inorganic recording layer 11 having SIZ or IGZO as the principal component, the power margin is able to be improved further compared to a case when the second protective layer 13 that is provided on the upper plane of the inorganic recording layer 11 has SIZ or IGZO as the principal component.

From the viewpoint of suppressing changes in the transmittance before and after recording, it is preferable that at least one of the first protective layer formation target and the second protective layer formation target be composed of a material with an extinction coefficient within a range of 0.05 to 0.6, and it is more preferable that both targets be composed of materials with an extinction coefficient within a range of 0.05 to 0.6. In a case when one of the first protective layer formation target and the second protective layer formation target is composed of a material with an extinction coefficient within a range of 0.05 to 0.6, it is preferable that the first protective layer formation target be composed of a material with an extinction coefficient within a range of 0.05 to 0.6. The reason is that by the first protective layer 12 that is provided on the lower plane of the inorganic recording layer 11 being composed of a material with an extinction coefficient within a range of 0.05 to 0.6, the changes in the transmittance before and after recording are able to be suppressed compared to a case when the second protective layer 13 that is provided on the upper plane of the inorganic recording layer 11 being composed of a material with an extinction material within a range of 0.05 to 0.6.

From the viewpoint of combining the realization of a favorable power margin and the suppression of changes in the transmittance before and after recording, it is preferable that one of the first protective layer formation target and the second protective layer formation target have SIZ or IGZO as the principal component, and that the other be composed of a material with an extinction coefficient within a range of 0.05 to 0.6.

(Formation Process of Information Signal Layer and Intermediate Layers)

Next, similarly to the formation process of the information signal layer L0 and the intermediate layer S1 described above, the information signal layer L1, the intermediate layer S2, the information signal layer L2, the intermediate layer S3, and the information signal layer L3 are sequentially laminated over the intermediate layer S1 in such an order. At this time, by adjusting the film formation conditions or the target composition as appropriate, the film thicknesses or the compositions of the first protective layer 12, the inorganic recording layer 11, and the second protective layer 13 that configure the information signal layers L1 to L3 may be adjusted as appropriate. Further, by adjusting the conditions of the spin coating method as appropriate, the thicknesses of the intermediate layers S1 to S3 may be adjusted as appropriate.

(Formation Process of Light Transmission Layer)

Next, after spin coating a photosensitive resin such as ultraviolet curable resin (UV resin) on the information signal layer L3 by a spin coating method, for example, the photosensitive resin is cured by irradiating the photosensitive resin with light such as ultraviolet rays. In so doing, the light transmission layer 2 is formed on the information signal layer L3.

By the processes described above, the desired optical information recording medium is obtained.

EXAMPLES

Although the disclosure will be described in detail below using test examples, the disclosure is not limited to only such test examples.

Below, the information signal layers of the multi-layer optical information recording medium will be referred to as the L0 layer, the L1 layer, the L2 layer . . . in order from the substrate side toward the laser irradiation plane side.

The extinction coefficients of the first protective layer and the second protective layer are measured as below in the test examples below. After producing a sample in which approximately 100 nm of the first protective layer or the second protective layer is laminated on a silicon wafer, the extinction coefficient of the sample at the recording wavelength of 405 nm of the medium was measured by a spectroscopic ellipsometer (manufactured by Otsuka Electronics Co., Ltd., product name: FE-5000).

The test examples will be described below in the following order.
1. Materials of First Protective Layer and Second Protective Layer
2. PdO Material Other Than WZCPO
3. Formation Position of SIZ Layer
4. Composition of Inorganic Recording Layer
5. Transmittance Range of Two-Layer Optical Information Recording Medium
6. Transmittance Range of Four-Layer Optical Information Recording Medium <1. Materials of First Protective Layer and Second Protective Layer>

Test Example 1-1

First, a polycarbonate substrate with a thickness of 1.1 mm was formed by injection molding. Here, a concavo-convex surface with grooves was formed on the polycarbonate substrate. Next, the L0 layer was formed by sequentially laminating the first protective layer (lower side), the inorganic recording layer, and the second protective layer (upper side) over the polycarbonate substrate.

The materials, thicknesses, and film formation methods of each layer of the L0 layer were as below.

First Protective Layer (Lower Side)
material: ITO ($SnO_2:In_2O_3$=10:90 (mass %))
thickness: 10 nm
film formation method: DC sputtering method
Inorganic Recording Layer
material: WZCPO (Cu:Zn:Pd:W=30.0:30.0:30.0:10.0 (atomic ratio (atomic %)))
thickness: 30 nm
film formation method: DC sputtering method ($O_2$ reactive sputter)
Second Protective Layer (Upper Side)
material: ITO ($SnO_2: In_2O_3$=10:90 (mass %))
thickness: 10 nm
film formation method: DC sputtering method Next, an ultraviolet curable resin (manufactured by Sony Chemical & Information Device Corporation, product name: SK5500B) was evenly applied over the L0 layer by a spin coating method. After then irradiating ultraviolet rays on the ultraviolet curable resin and curing the resin by pressing the concavo-convex pattern of a stamper on the ultraviolet curable resin that is evenly applied over the L0 layer, the stamper was removed. In so doing, an intermediate layer with grooves and a thickness of 15.5 μm was formed.

Next, the L2 layer was formed by sequentially laminating the first protective layer, the inorganic recording layer, and the second protective layer over the intermediate layer. Here, the formation of the L1 layer has been omitted.

The materials, thicknesses, and film formation methods of each layer of the L2 layer were as below.

First Protective Layer (Lower Side)
material: SIZ ($SiO_2:In_2O_3:ZrO_2$=35:30:35 (mol %))
thickness: 10 nm
film formation method: RF sputtering method
Inorganic Recording Layer
material: WZCPO (Cu:Zn:Pd:W=35.0:25.0:10.0:30.0 (atomic ratio (atomic %)))
film formation method: DC sputtering method ($O_2$ reactive sputter)
thickness: 40 nm
Second Protective Layer (Upper Side)
material: SIZ ($SiO_2:In_2O_3:ZrO_2$=35:30:35 (mol %))
thickness: 25 nm
film formation method: RF sputtering method Next, a resin layer of a thickness of 31.0 μm with a similar hardness to the intermediate layer was formed by evenly applying an ultraviolet curable resin over the L2 layer by a spin coating method and curing the resin by irradiating ultraviolet rays.

Next, a light transmission layer with a thickness of 53.5 μm was formed by evenly applying an ultraviolet curable resin (manufactured by Sony Chemical & Information Device Corporation, product name: SK8300) over the L1 layer by a spin coating method and curing the ultraviolet resin by irradiating ultraviolet rays.

A two-layer optical information recording medium that includes the L0 layer and the L2 layer was thus obtained. With such a two-layer optical information recording medium, by forming a resin layer between the L2 layer and the light transmission layer, the state of the L2 layer is practically the state of the L2 layer of a four-layer optical information recording medium.

Test Example 1-2

The optical information recording medium was obtained similarly to Test Example 1-1 other than the materials, thicknesses, and film formation methods of the first protective layer and the second protective layer of the L2 layer being as below.

First Protective Layer (Lower Side)
material: SIZ ($SiO_2:In_2O_3:ZrO_2$=30:40:30 (mol %))
thickness: 10 nm
film formation method: DC sputtering method
Second Protective Layer (Upper Side)
material: SIZ ($SiO_2:In_2O_3:ZrO_2$=30:40:30 (mol %))
thickness: 25 nm
film formation method: DC sputtering method Test Example 1-3

The optical information recording medium was obtained similarly to Test Example 1-1 other than the materials, thicknesses, and film formation methods of the first protective layer and the second protective layer of the L2 layer being as below.

First Protective Layer (Lower Side)
material: IGZO ($In_2O_3:Ga_2O_3:ZnO$=25:25:50 (mol %))
thickness: 10 nm
film formation method: DC sputtering method
Second Protective Layer (Upper Side)
material: IGZO ($In_2O_3:Ga_2O_3:ZnO$=25:25:50 (mol %))
thickness: 25 nm
film formation method: DC sputtering method Test Example 1-4

The optical information recording medium was obtained similarly to Test Example 1-1 other than the materials, thicknesses, and film formation methods of the first protective layer and the second protective layer of the L2 layer being as below.

First Protective Layer (Lower Side)
material: ITO ($SnO_2:In_2O_3$=10:90 (mass %))
thickness: 10 nm
film formation method: DC sputtering method
Second Protective Layer (Upper Side)
material: ITO ($SnO_2:In_2O_3$=10:90 (mass %))
thickness: 25 nm
film formation method: DC sputtering method Test Example 1-5

The optical information recording medium was obtained similarly to Test Example 1-1 other than the materials, thicknesses, and film formation methods of each layer of the L2 layer being as below.

First Protective Layer (Lower Side)
material: Si
thickness: 10 nm
film formation method: DC sputtering method ($N_2$ reactive sputter)
Second Protective Layer (Upper Side)
material: Si
thickness: 25 nm
film formation method: DC sputtering method ($N_2$ reactive sputter)

(Power Margins in Initial State)

The power margins of the L2 layers of the optical information recording media of Test Examples 1-1 to 1-5 obtained as described above in initial states were ascertained as below.

Using a disc tester (manufactured by Pulstec Industrial Co., Ltd., product name: ODU-1000), 1-7 modulation data with a density of 32 GB per layer was recorded and reproduced with a recording wavelength of 405 nm and a recording linear velocity of 7.69 m/s to ascertain the random symbol error rate (SER). A power margin PM when the SER was ascertained with respect to the recording power and when the side where the recording power that exceeds $4\times10^{-3}$ is low is Pwl, the high side is Pwh, and between Pwl and Pwh is the optimum power Pwo was obtained from Formula 1 below. Here, SER $4\times10^{-3}$ is the upper limit value of the SER before the error correction fails, and if $4\times10^{-3}$ is exceeded, it is said that defects occur in the reproduction data and the signal quality becomes extremely poor. The results thereof are illustrated in FIGS. 2A to 4B and Table 1.

Table 1 illustrates the evaluation results of the optical information recording media of Test Examples 1-1 to 1-5.

TABLE 1

|  | Test Example 1-1 | Test Example 1-2 | Test Example 1-3 | Test Example 1-4 | Test Example 1-5 |
| --- | --- | --- | --- | --- | --- |
| First Protective Layer/Second Protective Layer | SIZ/SIZ | SIZ/SIZ | IGZO/IGZO | ITO/ITO | SiN/SiN |
| Power Margin (SER) [%] | >32 | >31 | >30 | 20 | >24 |
| Film Formation Method | RF | DC | DC | DC | RF |
| Refractive Index | 1.89 | 2.03 | 2.06 | 2.23 | 1.89 |

SIZ: $SiO_2$—$In_2O_3$—$ZrO_2$
IGZO: $In_2O_3$—$Ga_2O_3$—$ZnO$
RF: radio frequency sputtering method
DC: direct current sputtering method The following is deduced from Table 1.

By using SIZ or IGZO as the materials of the first protective layer and the second protective layer, the power margin is able to be equal to or greater than 30%. Here, if the power margin is equal to or greater than 30%, it is possible to sufficiently absorb the influence of a reduction in the actual recording power that accompanies the warping due to the precision of recording power optimization of a consumer drive, unevenness in the in-plane sensitivity of the optical information recording medium, and the temperature or humidity of the optical information recording medium, and favorable recording with a low error rate is possible. In a case when SIZ is used as the material of the first protective layer and the second protective layer, the power margin is able to be widened as compared to a case when IGZO is used.

By using SIZ or IGZO as the materials of the first protective layer and the second protective layer, the transmittance of the information signal layer is able to be improved. It is therefore possible to increase the light amount of the laser light that reaches the L0 layer positioned at the deepest portion from the light irradiation plane.

By causing the content amount of the In oxide with respect to the SIZ within a range of equal to or greater than 40 mol %, the electrical resistance of the target becomes small and film formation by a DC sputtering method is possible. It is therefore possible to improve the film formation rate and to improve productivity.

By the above, in order to improve the power margin while maintaining the transmittance to be high, it is preferable that SIZ or IGZO be used as the material of the first protective layer and the second protective layer that are adjacent to the inorganic recording layer, and it is more preferable that IGZO be used.

Further, although it is preferable that the content amount of the In oxide with respect to the SIZ be equal to or greater than 40 mol % in order to improve the productivity, since the transmittance of the information signal layer decreases by the extinction coefficient of the SIZ thin film increasing if the content amount is too large, it is preferable that the ratio of the In oxide and the like be selected according to the desired transmittance or the productivity of the information recording layer.

<2. PdO Material other than WZCPO>

Test Example 2

First, a polycarbonate substrate with a thickness of 1.1 mm was formed by injection molding. Here, a concavo-convex surface with grooves was formed on the polycarbonate substrate. Next, the L0 layer was formed by sequentially laminating the first protective layer (lower side), the inorganic recording layer, and the second protective layer (upper side) over the polycarbonate substrate.

The materials, thicknesses, and film formation methods of each layer of the L0 layer were as below.

First Protective Layer (Lower Side)
  material: ITO ($SnO_2$:$In_2O_3$=10:90 (mass %))
  thickness: 10 nm
  film formation method: DC sputtering method
Inorganic Recording Layer
  material: $In_2O_3$—PdO (In:Pd=50:50 (atomic ratio (atomic %)))
  film formation method: DC sputtering method ($O_2$ reactive sputter)
  thickness: 30 nm
Second Protective Layer (Upper Side)
  material: ITO ($SnO_2$:$In_2O_3$=10:90 (mass %))
  thickness: 10 nm
  film formation method: DC sputtering method Next, an ultraviolet curable resin (manufactured by Sony Chemical & Information Device Corporation, product name: SK5500B) was evenly applied over the L0 layer by a spin coating method. After then irradiating ultraviolet rays on the ultraviolet curable resin and curing the resin by pressing the concavo-convex pattern of a stamper on the ultraviolet curable resin that is evenly applied over the layer L0, the stamper was removed. In so doing, an intermediate layer of a thickness of 15.5 μm with grooves was formed.

Next, the L1 layer was formed by sequentially laminating the first protective layer (lower side), the inorganic recording layer, and the second protective layer (upper side) over the intermediate layer.

The materials, thicknesses, and film formation methods of each layer of the L1 layer were as below.

First Protective Layer (Lower Side)
  material: ITO ($SnO_2$:$In_2O_3$=10:90 (mass %))
  thickness: 10 nm
  film formation method: DC sputtering method
Inorganic Recording Layer
  material: $In_2O_3$—PdO (In:Pd=70:30 (atomic ratio (atomic %)))
  film formation method: DC sputtering method ($O_2$ reactive sputter)
  thickness: 40 nm Second Protective Layer (Upper Side)
material: ITO ($SnO_2:In_2O_3=10:90$ (mass %))
thickness: 10 nm
film formation method: DC sputtering method Next, an ultraviolet curable resin (manufactured by Sony Chemical & Information Device Corporation, product name: SK5500B) was evenly applied over the L1 layer by a spin coating method. After then irradiating ultraviolet rays on the ultraviolet curable resin and curing the resin by pressing the concavo-convex pattern of a stamper on the ultraviolet curable resin that is evenly applied over the L1 layer, the stamper was removed. In so doing, an intermediate layer of a thickness of 19.5 μm with grooves was formed.

Next, the L2 layer was formed by sequentially laminating the first protective layer (lower side), the inorganic recording layer, and the second protective layer (upper side) over the intermediate layer.

The materials, thicknesses, and film formation methods of each layer of the L2 layer were as below.
First Protective Layer (Lower Side)
material: ITO ($SnO_2:In_2O_3=10:90$ (mass %))
thickness: 10 nm
film formation method: DC sputtering method
Inorganic Recording Layer
material: $In_2O_3$—PdO (In:Pd=70:30 (atomic ratio (atomic %)))
film formation method: DC sputtering method ($O_2$ reactive sputter)
thickness: 40 nm
Second Protective Layer (Upper Side)
material: SIZ ($SiO_2:In_2O_3:ZrO_2=40:30:40$ (mol %))
thickness: 10 nm
film formation method: RF sputtering method Next, an ultraviolet curable resin (manufactured by Sony Chemical & Information Device Corporation, product name: SK5500B) was evenly applied over the L2 layer by a spin coating method. After then irradiating ultraviolet rays on the ultraviolet curable resin and curing the resin by pressing the concavo-convex pattern of a stamper on the ultraviolet curable resin that is evenly applied over the L2 layer, the stamper was removed. In so doing, an intermediate layer of a thickness of 11.5 μm with grooves was formed.

Next, the L3 layer was formed by sequentially laminating the first protective layer (lower side), the inorganic recording layer, and the second protective layer (upper side) over the intermediate layer.

The materials, thicknesses, and film formation methods of each layer of the L3 layer were as below.
First Protective Layer (Lower Side)
material: SIZ ($SiO_2:In_2O_3:ZrO_2=40:30:40$ (mol %))
thickness: 10 nm
film formation method: RF sputtering method
Inorganic Recording Layer
material: $In_2O_3$—PdO (In:Zn:Sn:Pd=70:30 (atomic ratio (atomic %)))
film formation method: DC sputtering method ($O_2$ reactive sputter)
thickness: 35 nm
Second Protective Layer (Upper Side)
material: SIZ ($SiO_2:In_2O_3:ZrO_2=40:30:40$ (mol %))
thickness: 10 nm
film formation method: RF sputtering method Next, by evenly applying an ultraviolet curable resin (manufactured by Sony Chemical & Information Device Corporation, product name: SK8300) over the L3 layer by a spin coating method and curing the resin by irradiating ultraviolet rays, a light transmission layer with a thickness of 53.5 μm was formed.

By the above, the desired optical information recording medium was obtained.

(Power Margin)

The power margins of the L1 layer to the L3 layer of the optical information recording medium of Test Example 2 obtained as described above in initial states were ascertained similarly to Test Examples 1-1 to 1-5. The results thereof are illustrated in FIG. 5.

Figure 5:
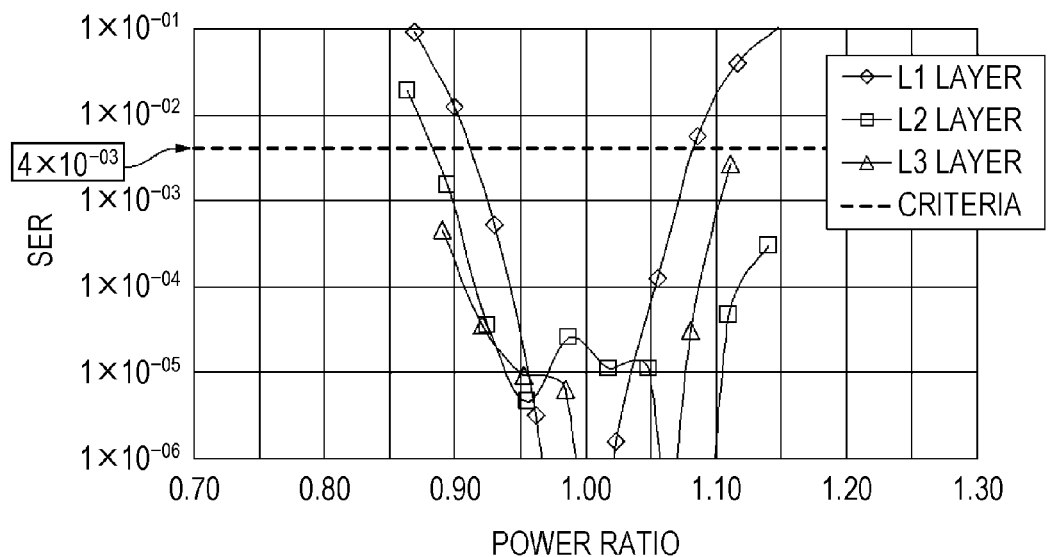
FIG. 5 is a graph that illustrates the power margin of an optical information recording medium of Test Example 2.

The following is deduced from FIG. 5.

Even in a case when a PdO-based material other than WZCPO is used for the inorganic recording layer, by using an SIZ layer on the surface of the inorganic recording layer, the power margin is able to be widened compared to a case when an ITO layer is used. Here, while the L1 layer uses ITO for both the upper and lower protective layers, the L2 layer uses ITO only for the first protective layer (lower side) and uses SIZ only for the second protective layer (upper side) and the L3 layer uses SIZ for both the upper and lower protective layers, where the power margin widens in order from L1, L2, to L3. It is therefore seen that the SIZ has an effect on widening the recording power margin. However, the degree of improvement in the power margin is greater in a case when a WZCPO layer and an SIZ layer are combined.

Here, although only a case when SIZ layers are used for the first protective layer and the second protective layer has been illustrated, it is considered that the same effects are also able to be obtained in a case when IGZO layers are used as the first protective layer and the second protective layer.

<3. Formation Position of SIZ Layer>

Test Example 3-1

The optical information recording medium was obtained similarly to Test Example 1-4.

Test Example 3-2

The optical information recording medium was obtained similarly to Test Example 3-1 other than the materials, thicknesses, and film formation methods of the first protective layer and the second protective layer of the L2 layer being as below.
First Protective Layer (Lower Side)
material: SIZ ($SiO_2:In_2O_3:ZrO_2=40:30:40$ (mol %))
thickness: 10 nm
film formation method: RF sputtering method Test Example 3-3

The optical information recording medium was obtained similarly to Test Example 3-1 other than the materials, thicknesses, and film formation methods of the first protective layer and the second protective layer of the L2 layer being as below.
Second Protective Layer (Lower Side)
material: SIZ ($SiO_2:In_2O_3:ZrO_2=40:30:40$ (mol %))
thickness: 25 nm
film formation method: RF sputtering method Test Example 3-4

The optical information recording medium was obtained similarly to Test Example 1-1.

(Power Margin)

The power margins of the L2 layers of the optical information recording media of Test Examples 3-1 to 3-4 obtained as described above in initial states were ascertained similarly to Test Examples 1-1 to 1-5. The results thereof are illustrated in FIG. 6.

Figure 6:
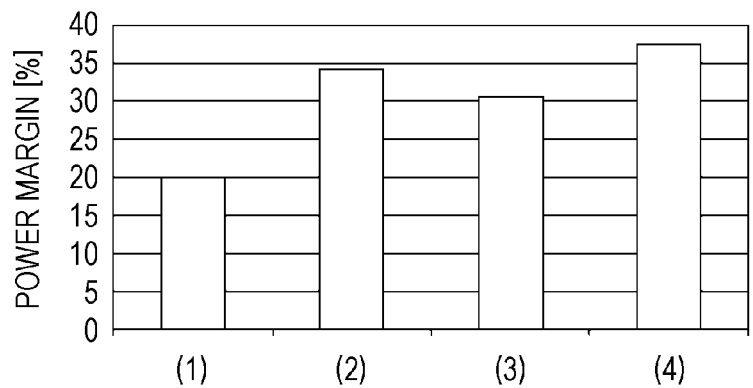
FIG. 6 is a graph that illustrates the power margins of optical information recording media of Test Examples 3-1 to 3-4.

The following is deduced from FIG. 6.

In a case when SIZ is used as the material of one of the first protective layer and the second protective layer, the power margin is able to be improved compared to a case when ITO is used as the material of both the first protective layer and the second protective layer.

In a case when SIZ is used as the material of the first protective layer (lower side), the power margin is able to be improved compared to a case when SIZ is used as the material of the second protective layer (upper side).

In a case when SIZ is used as the material of both the first protective layer and the second protective layer, the power margin is able to be improved compared to a case when SIZ is used as the material of one of the first protective layer and the second protective layer.

By the above, from the viewpoint of obtaining a favorable power margin, it is favorable that SIZ be used as the material of one of the first protective layer and the second protective layer, particularly the material of the first protective layer (lower side), and it is more preferable that SIZ be used as the material of both the first protective layer and the second protective layer.

Here, although only a case when SIZ layers are used as one or both of the first protective layer and the second protective layer has been shown, it is considered that the same effects are also able to be obtained in a case when IGZO layers are used as the first protective layer and the second protective layer.

<4. Composition of Inorganic Recording Layers>

Test Examples 4-1 to 4-15

First, a polycarbonate substrate with a thickness of 1.1 mm was formed by injection molding. Here, a concavo-convex surface with grooves was formed on the polycarbonate substrate. Next, the first protective layer, the inorganic recording layer, and the second protective layer were sequentially laminated over the polycarbonate substrate by a sputtering method. The specific configuration of each layer was as below.

First Protective Layer
material: SIZ, thickness: 10 nm
Inorganic Recording Layer
material: WZCPO, thickness: 40 nm
Second Protective Layer
material: SIZ, thickness: 10 nm The target composition was adjusted for each of Test Examples 4-1 to 4-15 so that the respective atomic ratios c, d, b, and a of the Cu, the Zn, the Pd, and the W within the WZCPO of the inorganic recording layer were the values illustrated in Table 2.

Next, by evenly applying an ultraviolet curable resin (manufactured by Sony Chemical & Information Device Corporation, product name: SK8300) over the second protective layer by a spin coating method and curing the resin by irradiating ultraviolet rays, a light transmission layer with a thickness of 100 μm was obtained.

By the above, the desired optical information recording medium was obtained.

(Transmittance Evaluation)

The transmittances of the optical information recording media of Test Examples 4-1 to 4-15 obtained as described above with respect to a recording wavelength of 405 nm were measured using a spectrophotometer (manufactured by JASCO Corporation, product name: V-530). The results are shown in Table 2.

Figure 7A:
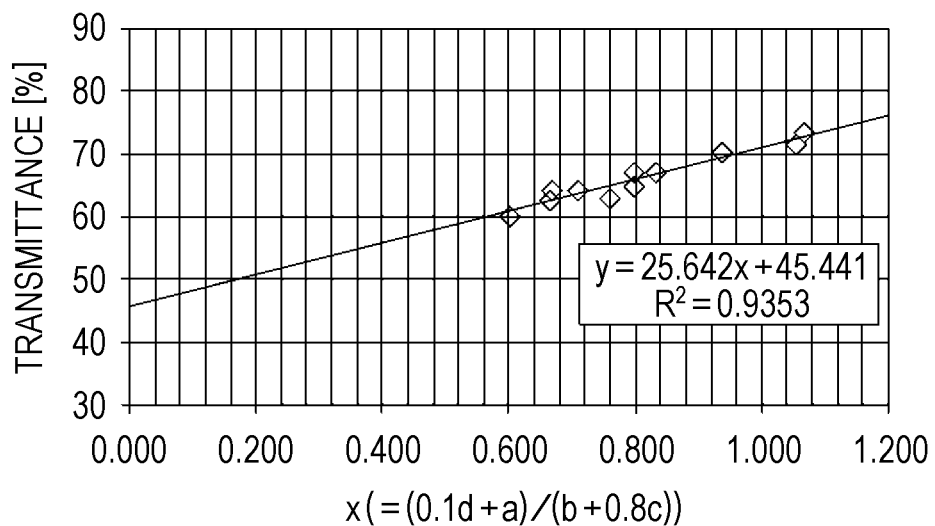
FIG. 7A is a graph that indicates the relationship between a variable x and the transmittance in optical information recording media of Test Examples 4-1 to 4-13 and FIG. 7B is a graph that indicates the relationship between the transmittance and an optimum recording power Pwo in optical information recording media of Test Examples 4-1 to 4-13.

Next, linear approximation was made by using the measured transmittance and the atomic ratios c, d, b, and a and determining each coefficient by multiplying a coefficient on each ratio so that the power of a determination coefficient R2 is the greatest with the sum of each ratio of the W oxide and the Zn oxide with relatively small extinction coefficients as the numerator and the sum of each ratio of the Pd oxide and the Cu oxide with relatively large extinction coefficients as the denominator. The results thereof are illustrated in FIG. 7A. In FIG. 7A, the horizontal axis indicates the variable $x(=(0.1d+a)/(b+0.8c))$, and the vertical axis indicates the transmittance. As illustrated in FIG. 7A, the linear approximation is represented by $y=25.642x+45.441$. Here, y indicates the transmittance [%] and x indicates $(0.1d+a)/(b+0.8c)$.

(Optimum Recording Power Evaluation)

Figure 7B:
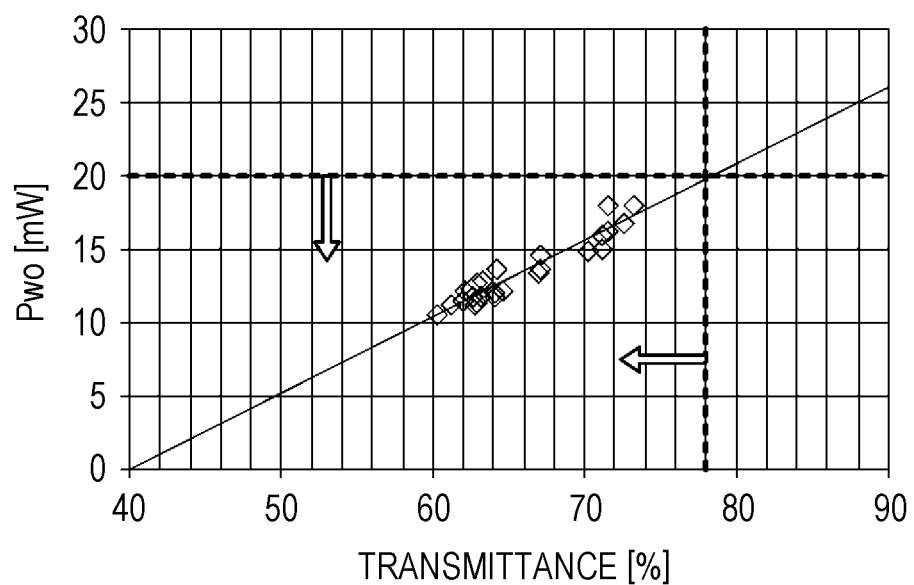

Using a disc tester (manufactured by Pulstec Industrial Co., Ltd., product name: ODU-1000), 1-7 modulation data with a density of 32 GB per layer was recorded and reproduced with a recording wavelength of 405 nm and a recording linear velocity of 7.69 m/s to ascertain the recording power at which the i-MLSE value is the smallest, and such a recording power was taken as the optimum recording power Pwo. The results are illustrated in FIG. 7B.

Figure 8:
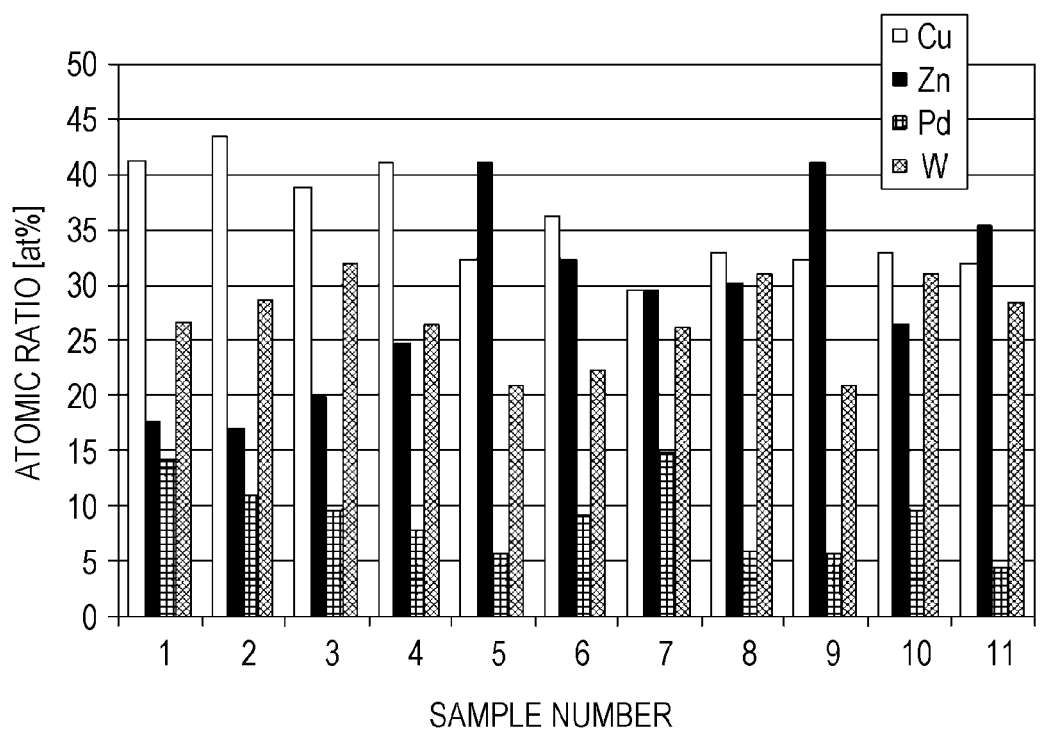
FIG. 8 is a graph that illustrates the composition ratio of an inorganic recording layer in optical information recording media of Test Examples 4-1 to 4-13.

Table 2 illustrates the composition ratios and the transmittances of the inorganic recording layers of Test Examples 4-1 to 4-15. FIG. 8 is a graph that illustrates the composition ratios of the inorganic recording layers of Test Examples 4-1 to 4-13.

TABLE 2

|  | Atomic Ratio c (Atomic %) of Cu | Atomic Ratio d (Atomic %) of Zn | Atomic Ratio b (Atomic %) of Pd | Atomic Ratio a (Atomic %) of W | $x_1$ $(0.1d + a)/$ $(b + 0.8c)$ | Transmittance (%) |
|---|---|---|---|---|---|---|
| Test Example 4-1 | 41.3 | 17.7 | 14.3 | 26.7 | 0.601 | 60 |
| Test Example 4-2 | 43.4 | 17 | 10.9 | 28.7 | 0.666 | 62.6 |
| Test Example 4-3 | 38.8 | 19.8 | 9.6 | 31.8 | 0.831 | 66.9 |

TABLE 2-continued

| | Atomic Ratio c (Atomic %) of Cu | Atomic Ratio d (Atomic %) of Zn | Atomic Ratio b (Atomic %) of Pd | Atomic Ratio a (Atomic %) of W | $x_1$ (0.1d + a)/ (b + 0.8c) | Transmittance (%) |
|---|---|---|---|---|---|---|
| Test Example 4-4 | 41.4 | 24.7 | 7.8 | 26.4 | 0.710 | 64.1 |
| Test Example 4-5 | 32.4 | 41 | 5.6 | 21 | 0.796 | 67.1 |
| Test Example 4-6 | 36.3 | 32.4 | 9.1 | 22.2 | 0.667 | 64.1 |
| Test Example 4-7 | 29.5 | 29.5 | 14.8 | 26.2 | 0.759 | 63 |
| Test Example 4-8 | 33 | 30.1 | 5.9 | 31 | 1.053 | 71.6 |
| Test Example 4-9 | 32.4 | 41 | 5.6 | 21 | 0.796 | 64.87 |
| Test Example 4-10 | 33 | 26.5 | 9.5 | 31 | 0.937 | 70.1 |
| Test Example 4-11 | 31.9 | 35.3 | 4.4 | 28.4 | 1.067 | 73.3 |
| Test Example 4-12 | 28.5 | 25 | 32.2 | 14.2 | 0.304 | 73.3 |
| Test Example 4-13 | 68.1 | 0 | 25.5 | 16.4 | 0.205 | 73.3 |
| Test Example 4-14 | 58.11 | 0 | 25.5 | 16.39 | 0.228 | 51.28 |
| Test Example 4-15 | 28.48 | 25.09 | 32.2 | 14.24 | 0.305 | 53.25 |

The following is deduced from the linear approximation y illustrated in FIG. 7A.

For the transmittance to be equal to or greater than 50%, it is preferable that the variable x be equal to or greater than 0.17.

For the transmittance to be equal to or greater than 55%, it is preferable that the variable x be equal to or greater than 0.37.

For the transmittance to be equal to or greater than 60%, it is preferable that the variable x be equal to or greater than 0.56.

For the transmittance to be equal to or less than 78%, it is preferable that the variable x be equal to or less than 1.26.

Here, with a multi-layer optical information recording medium, it is preferable that the transmittances of information signal layers equal to or higher than the L1 layer (L1 layer, L2 layer, L3 layer, . . . ) be equal to or greater than 55%. The reason why a transmittance equal to or greater than 55% is preferable will be described later. Here, with a two-layer disc using a recording film composition other than WZCPO (ZnS—SiO$_2$—Sb—Sn, TePdO, and the like), in order to increase the reflectance of the L0 layer, it is preferable that the transmittance of the L1 layer be equal to or greater than 50%.

The following is deduced from the linear approximation illustrated in FIG. 7B.

It is seen that for the optimum recording power Pwo to be equal to or less than 20 mW, it is preferable that the transmittance be equal to or less than 78%. Here, the optimum recording power Pwo: 20 mW is the upper limit value of the optimum recording power Pwo of a consumer drive device. If the upper limit value is exceeded, recording power becomes inadequate, and the signal quality deteriorates.

<5. Transmittance Range of Two-Layer Optical Information Recording Medium>

Test Examples 5-1 to 5-12

First, a polycarbonate substrate with a thickness of 1.1 mm was formed by injection molding. Here, a concavo-convex surface with grooves was formed on the polycarbonate substrate.

Next, the first protective layer, the inorganic recording layer, and the second protective layer were sequentially laminated over the polycarbonate substrate by a sputtering method to create the L0 layer. Here, the L0 layer is the L0 layer for a two-layer information recording medium.

The Specific configuration of each layer was as below.
First Protective Layer
  material: ITO, thickness: 10 nm
Inorganic Recording Layer
  material: WZCPO, thickness: 26 nm to 30 nm
  composition ratio: a=10, b=30, c=30, d=30.
Second Protective Layer
  material: TaN, thickness: 6 nm to 16 nm The film formation conditions for each of Test Examples 5-1 to 5-12 were adjusted so that the thicknesses of the inorganic recording layers and the second protective layers were the values shown in Table 3.

Next, by evenly applying an ultraviolet curable resin (manufactured by Sony Chemical & Information Device Corporation, product name: SK8300) over the second protective layer by a spin coating method and curing the resin by irradiating ultraviolet rays, a light transmission layer with a thickness of 100 μm was formed.

By the above, an optical information recording medium that includes only the L0 layer was obtained.

(i-MLSE evaluation)

The i-MLSE of the optical information recording media of Test Examples 5-1 to 5-12 obtained as described above was ascertained as below. Using a disc tester (manufactured by Pulstec Industrial Co., Ltd., product name: ODU-1000), the i-MLSE value was measured by recording and reproducing by 1-7 modulation data with a density of 32 GB per layer with NA=0.85, a recording wavelength of 405 nm, and a recording linear velocity of 7.69 m/s.

(Reflectance Evaluation)

The reflectances of the optical information recording media of Test Examples 5-1 to 5-12 obtained as described above were measured using a disc tester (manufactured by Pulstec Industrial Co., Ltd., product name: ODU-1000), with NA=0.85 and a recording wavelength of 405 nm. Here, the reflectance of a single-layer optical information recording medium manufactured using only the L0 layer of a two-layer optical information recording medium is referred to as the reflectance of the L0 layer alone.

Table 3 illustrates the measurement results of the i-MLSE and the reflectances of the optical information recording media of Test Examples 5-1 to 5-12.

TABLE 3

| | Material of First Protective Layer | Thickness of First Protective Layer (nm) | Material of Recording Layer | Thickness of Recording film (nm) | Material of Second Protective Layer | Thickness of Second Protective Layer (nm) | Reflectance (%) | i-MLSE (%) |
|---|---|---|---|---|---|---|---|---|
| Test Example 5-1 | ITO | 10 | WZCPO | 30 | TaN | 12 | 12.5 | 10.6 |
| Test Example 5-2 | | 10 | | 28 | | 12 | 13.4 | 10.6 |
| Test Example 5-3 | | 10 | | 26 | | 12 | 14.3 | 11.1 |
| Test Example 5-4 | | 10 | | 30 | | 10 | 12.6 | 10.3 |
| Test Example 5-5 | | 10 | | 28 | | 10 | 12.9 | 10.4 |
| Test Example 5-6 | | 10 | | 26 | | 10 | 14.1 | 11.0 |
| Test Example 5-7 | | 10 | | 30 | | 8 | 12.3 | 10.3 |
| Test Example 5-8 | | 10 | | 28 | | 8 | 12.8 | 10.2 |
| Test Example 5-9 | | 10 | | 26 | | 8 | 13.1 | 10.8 |
| Test Example 5-10 | | 10 | | 26 | | 6 | 11.5 | 9.8 |
| Test Example 5-11 | | 10 | | 26 | | 14 | 15.2 | 11.6 |
| Test Example 5-12 | | 10 | | 26 | | 16 | 16.2 | 12.2 |

WZCPO: mixture of W oxide, Pd oxide, Cu oxide, and Zn oxide

Figure 9A:
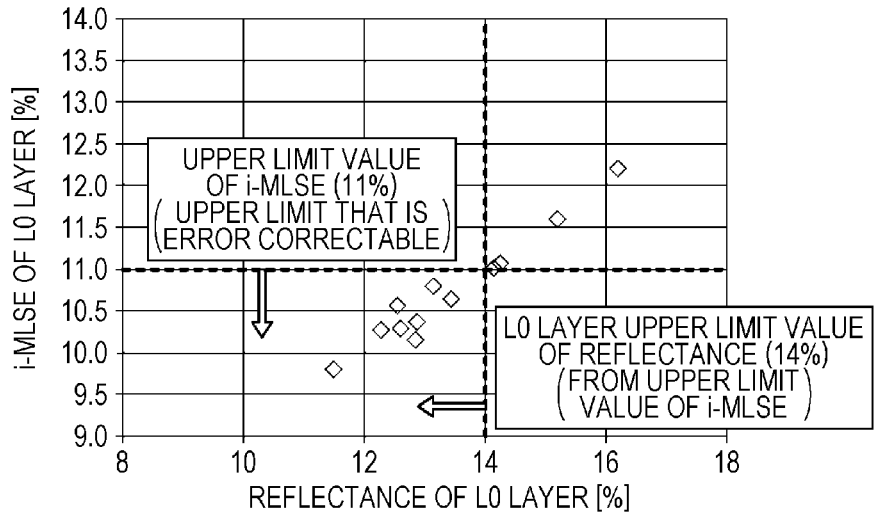
FIG. 9A is a graph that illustrates the relationship between the i-MLSE and the reflectance of the L0 layer in optical information recording media of Test Examples 5-1 to 5-12.

FIG. 9A is a graph that illustrates the relationship between the i-MLSE and the reflectances ascertained as described above. It is seen from FIG. 9A that for the i-MLSE value of the L0 layer to be equal to or less than 11%, it is important for the reflectance of the L0 layer to be equal to or less than 14%. Here, the i-MLSE value 11% is the upper limit value that is error correctable by a consumer drive device. Although the reflectance was able to be improved by causing any or a combination of the first protective layer, the inorganic recording layer, and the second protective layer to be thinner than the above film thicknesses, if any of the above is made thinner, the i-MLSE values would deteriorate. It is presumed that the i-MLSE values deteriorate since the formation of bubbles during recording becomes inappropriate as a result of changes in the heat accumulation or heat release of the inorganic recording layer.

Test Examples 5-13 to 5-24

With a reflectance of the L0 layer alone ascertained as described above of 14% as the premise, the reflectance of the L0 layer with respect to the transmittance of the L1 layer of a two-layer optical information recording medium was ascertained by calculation. The results thereof are illustrated in Table 4 and FIG. 9B. Here, if the reflectance of the L0 layer is R and the transmittance of L1 is T, R is calculated by Formula 1 below.

$$R = 14\% \text{ (reflectance of } L0 \text{ layer alone)} \times T^2 \quad (1)$$

Table 4 illustrates the reflectances of the L0 layers alone, the transmittances of the L1 layers, and the reflectances of the L0 layers of the optical information recording media of Test Examples 5-13 to 5-24.

TABLE 4

| | Reflectance of L0 Layer alone (%) | Transmittance of L1 Layer (%) | Reflectance of L0 layer (%) |
|---|---|---|---|
| Test Example 5-13 | 14 | 30 | 1.3 |
| Test Example 5-14 | 14 | 35 | 1.7 |
| Test Example 5-15 | 14 | 40 | 2.2 |
| Test Example 5-16 | 14 | 45 | 2.8 |
| Test Example 5-17 | 14 | 50 | 3.5 |
| Test Example 5-18 | 14 | 55 | 4.2 |
| Test Example 5-19 | 14 | 60 | 5.0 |
| Test Example 5-20 | 14 | 65 | 5.9 |
| Test Example 5-21 | 14 | 70 | 6.9 |

TABLE 4-continued

| | Reflectance of L0 Layer alone (%) | Transmittance of L1 Layer (%) | Reflectance of L0 layer (%) |
|---|---|---|---|
| Test Example 5-22 | 14 | 75 | 7.9 |
| Test Example 5-23 | 14 | 80 | 9.0 |
| Test Example 5-24 | 14 | 85 | 10.1 |

Figure 9B:
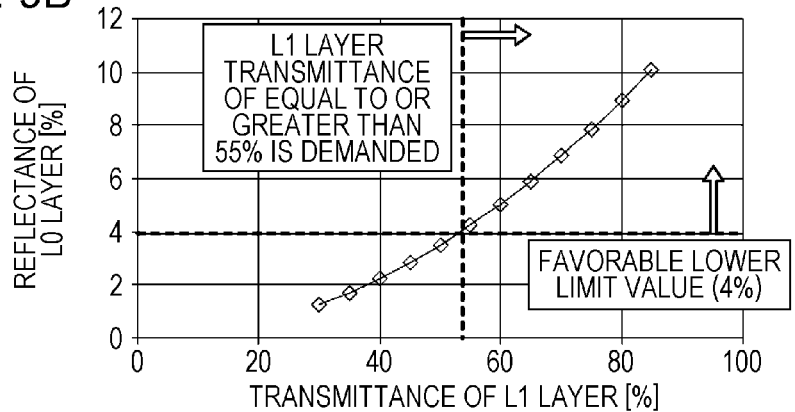
FIG. 9B is a graph that illustrates the relationship between the transmittance of the L1 layer and the reflectance of the L0 layer in optical information recording media of Test Examples 5-13 to 5-24.

It is seen from FIG. 9B that for the reflectance of the L1 layer of a two-layer optical information recording medium to be equal to or greater than 4%, it is important for the transmittance of the L1 layer to be equal to or greater than 55%. Here, the reflectance 4% of the L1 layer is the lower limit value that is demanded for an information signal to be reproduced using a consumer two-layer compatible drive device.

<6. Transmittance Range of Four-Layer Optical Information Recording Medium>

Test Examples 6-1 to 6-9

The i-MLSE of the L0 layer when the transmittance of the L1 layer alone of a four-layer optical information recording medium is changed was measured. The results are illustrated in Table 5 and FIG. 9C. Here, since the recording properties of L1 are not the subject of interest, adjustment of the transmittance of the L1 layer was performed by the adjustment of the thickness of the inorganic recording layer according to the conditions below.

Specific film configurations of the L1 layer were as below.
First Protective Layer
material: ITO, thickness: 7 nm
Inorganic Recording Layer
material: WZCPO, thickness: 2 nm to 130 nm
composition ratio: a=25, b=10, c=40, d=25.
Second Protective Layer
material: ITO, thickness: 10 nm
Specific film configurations of the L0 layer were as below.
First Protective Layer
material: ITO, thickness: 8 nm
Inorganic Recording Layer
material: WZCPO, thickness: 30 nm
composition ratio: a=10, b=30, c=30, d=30.
Second Protective Layer
material: TaN, thickness: 10 nm Table 5 illustrates the transmittances of the L1 layers and the i-MLSE values of the L0 layers of the optical information recording media of Test Examples 6-1 to 6-9.

TABLE 5

| | Thickness of Inorganic Recording Layers of L1 Layer (nm) | Transmittance of L1 Layer (%) | i-MLSE of L0 Layer (%) |
|---|---|---|---|
| Test Example 6-1 | 130 | 35 | 14.6 |
| Test Example 6-2 | 100 | 40 | 13 |
| Test Example 6-3 | 80 | 45 | 12 |
| Test Example 6-4 | 60 | 50 | 11.2 |
| Test Example 6-5 | 50 | 55 | 10.8 |
| Test Example 6-6 | 40 | 60 | 10.5 |
| Test Example 6-7 | 30 | 65 | 10.2 |
| Test Example 6-8 | 15 | 70 | 10 |
| Test Example 6-9 | 2 | 75 | 10 |

Figure 9C:
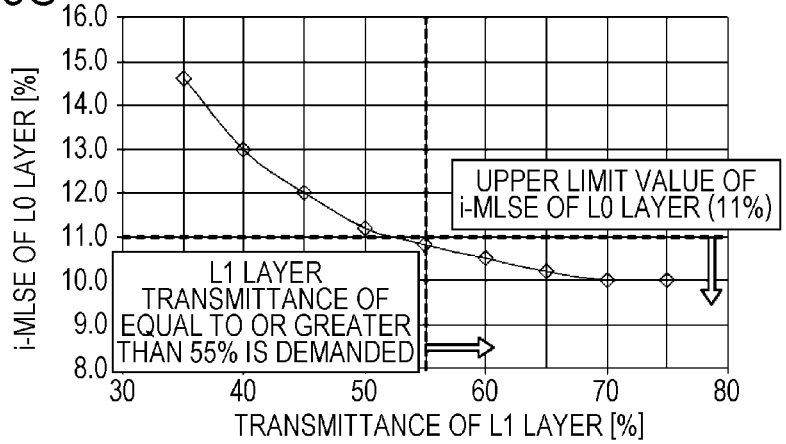
FIG. 9C is a graph that illustrates the relationship between the transmittance of the L1 layer and the i-MLSE of the L0 layer of optical information recording media of Test Examples 6-1 to 6-9.

It is seen from FIG. 9C that for the i-MLSE value of the L0 layer to be equal to or less than 11%, it is important for the transmittance of the L1 layer to be equal to or greater than 55%. Here, the i-MLSE value 11% is the upper limit value that is error correctable by a consumer drive device. The reason is that in a case when the transmittance of the L1 layer is low, since the signal amount of the L0 layer decreases, it is thought that sufficient S/N for reproduction is not obtained. Therefore, the higher the transmittance of L1, the better the signal properties of the L0 layer.

By the above, it is seen that with a multi-layer optical information recording medium with two layers or four layers, it is preferable that the transmittances of information signal layers equal to or higher than the L1 layer (L1 layer, L2 layer, L3 layer, . . . ) be equal to or greater than 55%.

Test Example 7-1

The optical information recording medium was obtained similarly to Test Example 1-1 other than the L1 layer being used instead of the L2 layer and the inorganic recording layer of the L1 layer, the first protective layer, and the second protective layer being configured as below.
Inorganic Recording Layer
material: WZCPO (W:Pd:Cu:Zn=25:10:40:d=25)
thickness: 40 nm
First Protective Layer (Lower Side)
material: SIZ ($SiO_2$:$In_2O_3$:$ZrO_2$=40:30:40 (mol %))
extinction coefficient k: 0.00
thickness: 7 nm
Second Protective Layer (Upper Side)
material: SIZ ($SiO_2$:$In_2O_3$:$ZrO_2$=40:30:40 (mol %))
extinction coefficient k: 0.00
thickness: 8 nm Test Example 7-2

The optical information recording medium was obtained similarly to Test Example 7-1 other than the second protective layer of the L1 layer being configured as below.
Second Protective Layer (Upper Side)
material: ITO ($SnO_2$:$In_2O_3$=10:90 (mass %))
extinction coefficient k: 0.07
thickness: 8 nm Test Example 7-3

The optical information recording medium was obtained similarly to Test Example 7-1 other than the first protective layer of the L1 layer being configured as below.
First Protective Layer (Lower Side)
material: ITO ($SnO_2$:$In_2O_3$=10:90 (mass %))
extinction coefficient k: 0.07
thickness: 7 nm Test Example 7-4

The optical information recording medium was obtained similarly to Test Example 7-1 other than the first protective layer and the second protective layer of the L1 layer being configured as below.
First Protective Layer (Lower Side)
material: ITO ($SnO_2$:$In_2O_3$=10:90 (mass %))
extinction coefficient k: 0.07
thickness: 7 nm
Second Protective Layer (Upper Side)
material: ITO ($SnO_2$:$In_2O_3$=10:90 (mass %))
extinction coefficient k: 0.07
thickness: 8 nm Test Example 7-5

The optical information recording medium was obtained similarly to Test Example 7-1 other than the first protective layer and the second protective layer of the L1 layer being configured as below.
First Protective Layer (Lower Side)
material: SiN (incomplete nitride)
extinction coefficient k: 0.28
thickness: 7 nm
Second Protective Layer (Upper Side)
material: SiN (incomplete nitride)
extinction coefficient k: 0.28
thickness: 8 nm Test Example 7-6

The optical information recording medium was obtained similarly to Test Example 7-4 other than the inorganic recording layer of the L1 layer being configured as below.
material: $In_2O_3$—PdO (In:Pd=70:30 (atomic ratio (atomic %))
film formation method: DC sputtering method ($O_2$ reactive sputter)
thickness: 40 nm
(Rate of Change in Transmittance Before and after Recording)

The rates of change in the transmittances of the L1 layers of the optical information recording media of Test Examples 7-1 to 7-6 obtained as described above were ascertained as below. If the L0 reflectance before recording on L1 is R, the L0 reflectance during L1 recording is R', the L1 transmittance before L1 recording is T, and the L1 transmittance during L1 recording is T, the rate of change in the transmittance before and after recording α is able to be represented by Formula 1 above and Formula 2 below.

$$\alpha=(T'/T)-1=(R'/R)^{1/2}-1 \quad (2)$$

Figure 10:
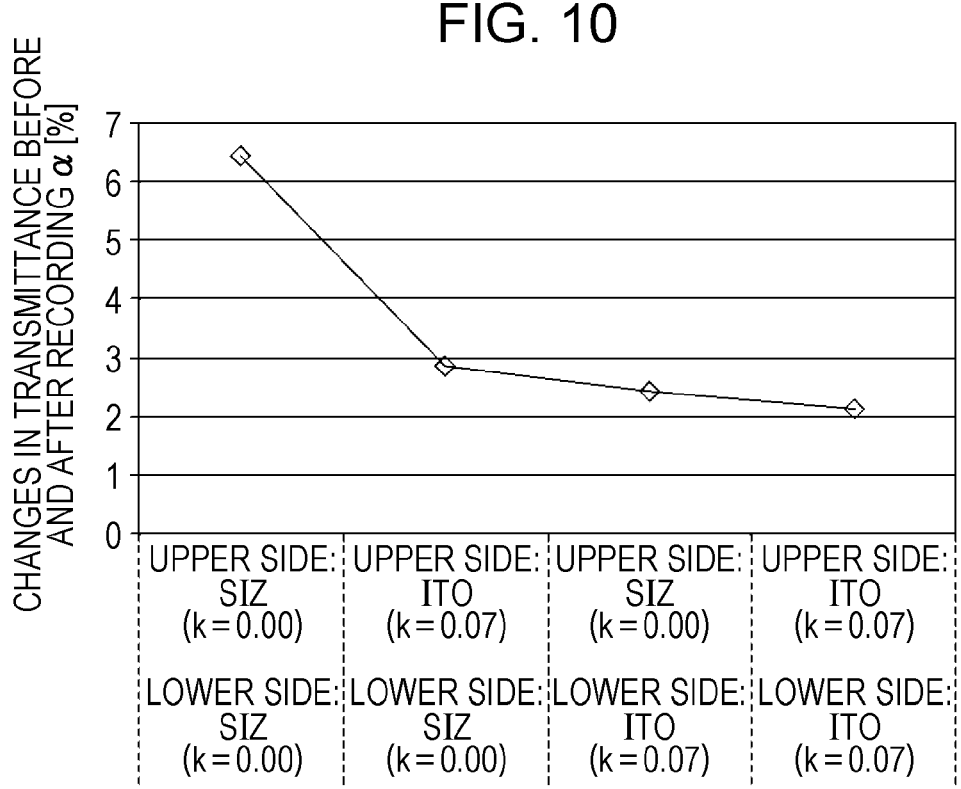
FIG. 10 is a graph that illustrates the evaluation result of the rate of change in the transmittance before and after recording of optical information recording media of Test Examples 7-1 to 7-4.

The results thereof are illustrated in Table 6 and FIG. 10.

Table 6 and FIG. 10 illustrate the evaluation results of changes in the transmittances before and after the recording of the optical information recording media of Test Examples 7-1 to 7-6.

TABLE 6

| | Inorganic Recording Layer Material | First Protective Layer (lower side) Material | First Protective Layer (lower side) Extinction Coefficient k | Second Protective Layer (upper side) Material | Second Protective Layer (upper side) Extinction Coefficient k | L0 Reflectance Before Recording R (%) | L0 Reflectance after Recording R' (%) | Rate of Change in L1 Transmittance After Recording α (%) |
|---|---|---|---|---|---|---|---|---|
| Test Example 7-1 | WZCPO | SIZ | 0 | SIZ | 0 | 6.58 | 7.45 | 6.4 |
| Test Example 7-2 | WZCPO | SIZ | 0 | ITO | 0.07 | 6.22 | 6.58 | 2.9 |
| Test Example 7-3 | WZCPO | ITO | 0.07 | SIZ | 0 | 6.66 | 6.99 | 2.4 |
| Test Example 7-4 | WZCPO | ITO | 0.07 | ITO | 0.07 | 6.66 | 6.94 | 2.1 |
| Test Example 7-5 | WZCPO | SiN | 0.28 | SiN | 0.28 | 6.60 | 6.74 | 1.1 |
| Test Example 7-6 | IPO | ITO | 0.07 | ITO | 0.07 | 6.78 | 7.85 | 7.6 |

SIZ: $SiO_2$—$In_2O_3$—$ZrO_2$
ITO: $In_2O_3$—$SnO_2$
WZCPO: mixture of W oxide, Pd oxide, Cu oxide, and Zn oxide
IPO: $In_2O_3$—PdO The following is deduced from Table 6 and FIG. 10.

In a case when ITO (k=0.07) is used as the material of one of the first protective layer and the second protective layer, changes in the transmittance before and after recording are able to be suppressed compared to a case when SIZ (k=0.00) is used as the material of both the first protective layer and the second protective layer.

In a case when ITO (k=0.07) is used as the material of the first protective layer (lower side), changes in the transmittance before and after recording are able to be suppressed compared to a case when ITO (k=0.07) is used as the material of the second protective layer (upper side).

In a case when ITO (k=0.07) is used as the material of both the first protective layer and the second protective layer, changes in the transmittance before and after recording are able to be suppressed compared to a case when ITO (k=0.07) is used as the material of one of the first protective layer and the second protective layer.

Furthermore, in a case when SiN (k=0.28) is used as the material of both the first protective layer and the second protective layer, changes in the transmittance before and after recording are able to be further suppressed compared to a case when ITO (k=0.07) is used as the material of both the first protective layer and the second protective layer.

By the above, from the viewpoint of suppressing changes in the transmittance before and after recording, it is preferable that a material (for example, ITO, SiN) with an extinction coefficient k of equal to or greater than 0.05 be used as the material of one of the first protective layer and the second protective layer, particularly as the material of the first protective layer (lower side), and from the viewpoint of storage reliability, it is more preferable that a material (for example, ITO) with an extinction coefficient k of equal to or greater than 0.05 be used as the material of both the first protective layer and the second protective layer. Here, as a favorable range of the rate of change in the transmittance, α=equal to or less than 3%. In the case of a four-layer medium, if there are three transmission information signal layers other than the layer at the deepest portion, and the total influence to the L0 layer is equal to or less than 10%, there is a demand for each layer to be equal to or less than 3%. The reason is that the signals deteriorate by the recording state deviating greatly from the optimum if the influence of the transmittance to the L0 layer becomes equal to or greater than 10% by the effective recording power of the L0 layer at portions where the above information signal layers other than the layer at the deepest portion are all recorded and portions where the layers are not recorded differing greatly.

Test Examples 8-1 to 8-7

The difference in transmittance before and after the recording of information signals was ascertained by simulation by changing the values of the extinction coefficients (k=0 to 2) of the first protective layer and the second protective layer. Here, WZCPO is assumed as the material of the recording layer, and a multiple interference method was used as the simulation.

Table 7 illustrates the setting conditions of the simulation before the recording of information signals.

TABLE 7

| | Layer Structure | Thickness | n | k |
|---|---|---|---|---|
| Before Recording | PSA | 0 | 1.59 | 0 |
| | Second Protective Layer (upper side) | 8 | 1.9 | 0-2 |
| | WZCPO | 40 | 2.23 | 0.19 |
| | First Protective Layer (lower side) | 7 | 1.9 | 0-2 |
| | Intermediate Layer | 0 | 1.59 | 0 | n: refractive index
k: extinction coefficient
PSA: Pressure Sensitive Adhesive
WZCPO: mixture of W oxide, Pd oxide, Cu oxide, and Zn oxide Table 8 illustrates the setting conditions of the simulation after the recording of information signals.

TABLE 8

| | Layer Structure | Thickness | n | k |
|---|---|---|---|---|
| After Recording | PSA | 0 | 1.59 | 0 |
| | Second Protective Layer (upper side) | 8 | 1.9 | 0 to 2 |
| | WZCPO | 40 | 1.984 | 0.133 |
| | First Protective Layer (lower side) | 7 | 1.9 | 0 to 2 |
| | Intermediate Layer | 0 | 1.59 | 0 | n: refractive index
k: extinction coefficient
PSA: Pressure Sensitive Adhesive
WZCPO: mixture of W oxide, Pd oxide, Cu oxide, and Zn oxide Here, taking in consideration the fact that oxygen vacancies are generated in the recording layer after recording, the values of the extinction coefficient k and the refractive index n of the recording layer before and after the recording of information signals were assumed and only the extinction coefficient k was changed. Here, otherwise, the extinction coefficients k or the refractive indices n of the recording layer before recording, the first protective layer and the second protective layer, the intermediate layer, and the PSA (Pressure Sensitive Adhesive) were actual values.

Figure 11:
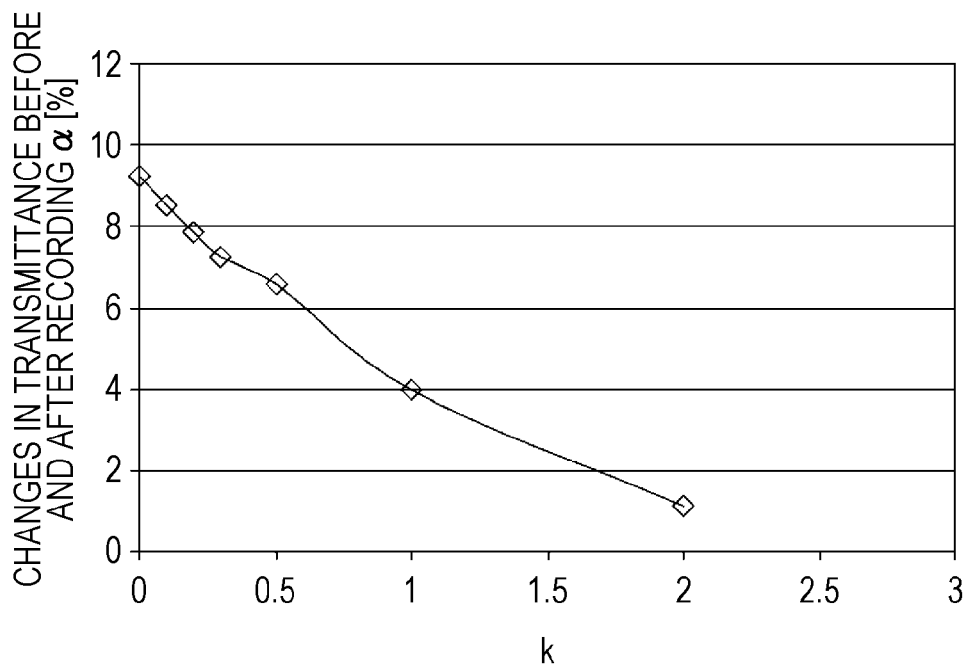
FIG. 11 is a graph that illustrates the simulation results of the rate of change in the transmittance before and after recording of optical information recording media of Test Examples 8-1 to 8-7.

Table 9 and FIG. 11 illustrate the results of the simulation.

TABLE 9

|  | k | T (%) | T' (%) | α (%) |
|---|---|---|---|---|
| Test Example 8-1 | 0 | 72.24 | 81.47 | 12.8 |
| Test Example 8-2 | 0.1 | 69.42 | 77.95 | 12.3 |
| Test Example 8-3 | 0.2 | 66.68 | 74.55 | 11.8 |
| Test Example 8-4 | 0.3 | 64.03 | 71.29 | 11.3 |
| Test Example 8-5 | 0.5 | 58.59 | 65.16 | 11.2 |
| Test Example 8-6 | 1 | 47.86 | 51.84 | 8.3 |
| Test Example 8-7 | 2 | 31.01 | 32.14 | 3.6 | k: extinction coefficient
T: transmittance before recording (%)
T': transmittance after recording (%)
α: rate of change of transmittance before and after recording (%)

The following is deduced from Table 9 and FIG. 11.

As the extinction coefficient increases, there is a tendency for the difference in transmittance before and after the recording of information signals to decrease. Here, the reason for the discrepancy between the values (simulation values) of the differences in the transmittance illustrated in Table 9 and FIG. 11 and the values (experimental values) of the differences in the transmittance illustrated in Table 6 and FIG. 11 is that with a simulation, the presence of lands and grooves and the size of recording marks are not considered, and that the recording layer actually expanding during recording is not considered in optical simulation. From such results, it is seen that the greater the extinction coefficient of a protective layer that is adjacent to the WPO recording layer, the smaller the changes in the transmittance of the information signal layer before and after recording.

Further, although a mainly WPO (mixture of a W oxide and a Pd oxide) recording layer has an area ratio of 30% for the proportion of oxygen vacancies during recording, since a mainly IPO (mixture of an In oxide and a Pd oxide) recording layer has larger oxygen vacancies during recording than does WPO and changes in the transmittance before and after recording increase, from the viewpoint of suppressing changes in the transmittance, it is preferable that a WPO material, preferably WZCPO be used as the recording layer.

Test Examples 9-1 to 9-11

The transmittance was ascertained by simulation by changing the values (k=0 to 1) of the extinction coefficients of the first protective layer and the second protective layer. Here, a multiple interference method was used as the simulation.

Table 10 illustrates the setting conditions of the simulation.

TABLE 10

| Layer Configuration | Thickness | n | k |
|---|---|---|---|
| PSA | 0 | 1.59 | 0 |
| Second Protective Layer (upper side) | 8 | 1.9 | 0 to 1 |
| WZCPO | 40 | 2.23 | 0.19 |
| First Protective Layer (lower side) | 7 | 1.9 | 0 to 1 |
| Intermediate Layer | 0 | 1.59 | 0 | n: refractive index
k: extinction coefficient
PSA: Pressure Sensitive Adhesive
WZCPO: mixture of W oxide, Pd oxide, Cu oxide, and Zn oxide Table 11 and FIG. 12 illustrate the results of the simulation.

TABLE 11

|  | k | T (%) |
|---|---|---|
| Test Example 9-1 | 0 | 72.24 |
| Test Example 9-2 | 0.1 | 69.42 |
| Test Example 9-3 | 0.2 | 66.68 |
| Test Example 9-4 | 0.3 | 64.03 |
| Test Example 9-5 | 0.4 | 61.47 |
| Test Example 9-6 | 0.5 | 58.99 |
| Test Example 9-7 | 0.6 | 56.60 |
| Test Example 9-8 | 0.7 | 54.29 |
| Test Example 9-9 | 0.8 | 52.07 |
| Test Example 9-10 | 0.9 | 49.93 |
| Test Example 9-11 | 1 | 47.86 | k: extinction coefficient
T: transmittance

Figure 12:
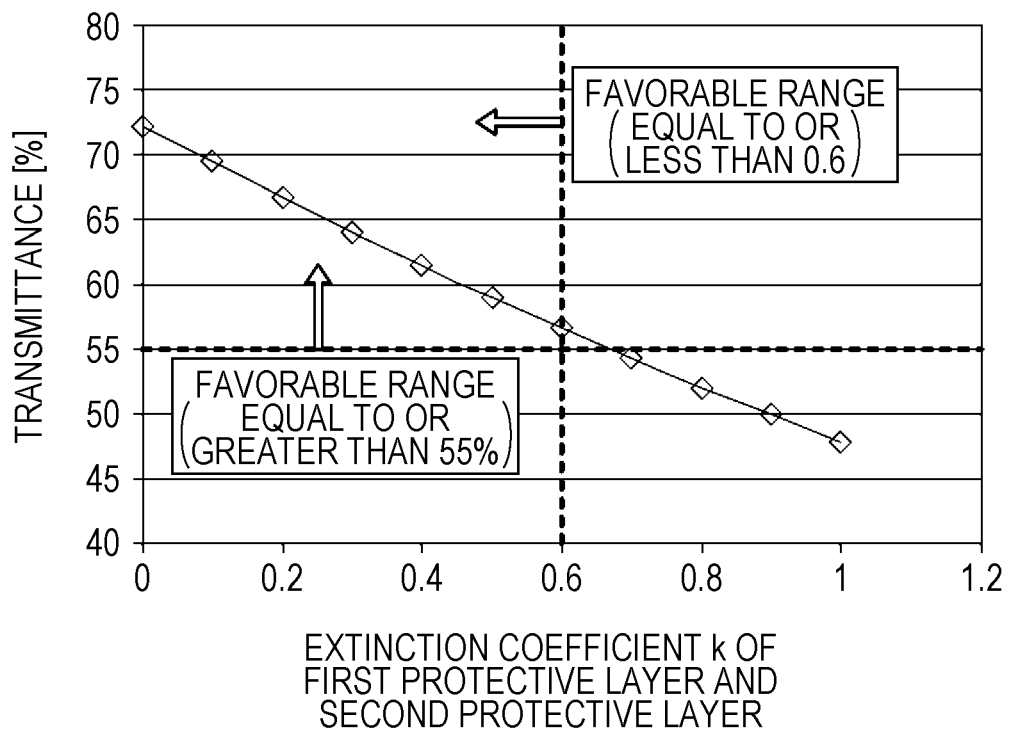
FIG. 12 is a graph that illustrates the relationship between the extinction coefficient and the transmittance in optical information recording media of Test Examples 9-1 to 9-11.

The following is deduced from Table 11 and FIG. 12.

It is seen that by keeping the values of the extinction coefficients of the first protective layer and the second protective layer equal to or less than 0.6, the transmittance is able to be equal to or greater than 55%.

That is, while the properties demanded of information signal layers other than the layer at the deepest portion are (1) suppression of changes in the transmittance before and after recording and (2) high transmittance, with respect to (1), it is preferable that the extinction coefficients of the protective layers be large, and with respect to (2), it is preferable that the extinction coefficients of the protective layers be small. Particularly in the case of a multi-layer medium, the preferable range of the extinction coefficient is 0.05 to 0.6.

Although the embodiments of the disclosure have been described in detail above, the disclosure is not limited to the embodiments described above, and various modifications based on the technical ideas of the embodiments of the disclosure are possible.

For example, the configurations, methods, processes, shapes, materials, and numerical values exemplified in the embodiments described above are only examples, and different configurations, methods, processes, shapes, materials, and numerical values may be used as necessary.

Further, the configurations, methods, processes, shapes, materials, and numerical values of the embodiments described above may be combined with one another within a range that does not depart from the gist of the disclosure.

Furthermore, although a case when the optical information recording medium includes a four-layer information signal layer has been described as an example in the embodiments described above, the number of layers of the information signal layer is not limited thereto, and it is possible for the information signal layer to have an arbitrary number of layers of two layers or more.

In addition, although a case when the disclosure is applied to an optical information recording medium with a configuration in which two or more information signal layers and a light transmission layer are laminated in such an order on a substrate and in which recording or reproduction of information signals is performed by irradiating laser light on the information signal layers from the light transmission layer side has been described as an example in the embodiments described above, the disclosure is not limited to such an example. For example, the disclosure is able to be applied to an optical information recording medium with a configuration in which two or more information signal layers and a protective layer are laminated in such an order on a substrate and in which recording or reproduction of information signals is performed by irradiating laser light on the two or more information signal layers from the substrate side or to an optical information recording medium with a configuration in which two or more information signal layers are provided between two substrates while recording or reproduction of information signals is performed by irradiating laser light on the information signal layers from the side of one of the substrates.

Further, although a case when each layer of the optical information recording medium is formed by a sputtering method has been described as an example in the embodiments described above, the film formation method is not limited thereto, and other film formation methods may be used. As other film formation methods, for example, CVD methods (Chemical Vapor Deposition: technique in which a thin film is separated from a vapor phase using a chemical reaction) such as heat CVD, plasma CVD, or light CVD, PVD methods (Physical Vapor Deposition: technique in which a thin film is formed by agglomerating a material that is physically vaporized in a vacuum on a substrate) such as vacuum deposition, plasma-assisted deposition, or ion plating may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical information recording medium comprising:
    a substrate;
    a plurality of information signal layers provided on the substrate; and
    a cover layer provided on the information signal layers,
    wherein a surface of one of a side of the substrate and the cover layer is a light irradiation plane on which light for recording information signals on the two or more information signal layers is irradiated,
    wherein a plurality of the information signal layers other than an information signal layer at a deepest portion from the light irradiation plane include:
        an inorganic recording layer that includes a W oxide and a Pd oxide,
        a first protective layer that is provided on a first principal plane of the inorganic recording layer, and
        a second protective layer that is provided on a second principal plane of the inorganic recording layer,
    wherein for a first information signal layer other than the information signal layer at the deepest portion from the light irradiation plane, at least one of the first protective layer and the second protective layer is a layer with an extinction coefficient of 0.05 to 0.6, and
    wherein for a second information signal layer other than the information signal layer at the deepest portion from the light irradiation plane, and closer to the light irradiation plane relative to the first information signal layer, at least one of the first protective layer and the second protective layer is a layer with an extinction coefficient of 0.

2. The optical information recording medium according to claim 1,
    wherein in the first information signal layer, the layer that includes the extinction coefficient has a mixture of an In oxide and an Sn oxide or silicon nitride as the principal component.

3. The optical information recording medium according to claim 1,
    wherein for one of either the first and second information signal layers, one of the first protective layer and the second protective layer is a layer with an extinction coefficient of 0.05 to 0.6, and the other is a layer with an extinction coefficient of 0.

4. The optical information recording medium according to claim 1,
    wherein for the first information signal layer, out of the first protective layer and the second protective layer, a layer on the opposite side to the light irradiation plane is a layer with an extinction coefficient of 0.05 to 0.6.

5. The optical information recording medium according to claim 1,
    wherein for the first information signal layer, both of the first protective layer and the second protective layer are layers with an extinction coefficient of 0.05 to 0.6.

6. The optical information recording medium according to claim 1,
    wherein for the first information signal layer, one of the first protective layer and the second protective layer is a layer with an extinction coefficient of 0.05 to 0.6, and the other has an extinction coefficient of 0 and is a complex oxide of an Si oxide, an In oxide, and a Zr oxide (SIZ) or a complex oxide of an In oxide, a Ga oxide, and a Zn oxide (IGZO) as the principal components.

7. The optical information recording medium according to claim 1,
    wherein the inorganic recording layer further includes a Cu oxide.

8. The optical information recording medium according to claim 7,
    wherein the inorganic recording layer further includes a Zn oxide.

9. The optical information recording medium according to claim 1, wherein for the second information signal layer both of the first protective layer and the second protective layer includes either a complex oxide of an Si oxide, an In oxide, and a Zr oxide (SIZ) or a complex oxide of an In oxide, a Ga oxide, and a Zn oxide (IGZO) as the principal components.

10. The optical information recording medium according to claim 1, wherein for the second information signal layer both of the first protective layer and the second protective layer includes a complex oxide of an In oxide, a Ga oxide, and a Zn oxide (IGZO) as the principal component.

* * * * *